US011953234B2

(12) United States Patent
Rico et al.

(10) Patent No.: US 11,953,234 B2
(45) Date of Patent: *Apr. 9, 2024

(54) DEVICE FOR SUPPORTING SOLAR MODULES, KIT, METHOD FOR MANUFACTURING, AND SOLAR MODULE ARRANGEMENT

(71) Applicant: Mounting Systems GmbH, Rangsdorf (DE)

(72) Inventors: Txaber Vaca Rico, Leioa (ES); Carsten Philippi, Ludwigsfelde (DE)

(73) Assignee: MOUNTING SYSTEMS GMBH, Rangsdorf (DE)

( * ) Notice: Subject to any disclaimer, the term of this patent is extended or adjusted under 35 U.S.C. 154(b) by 91 days.

This patent is subject to a terminal disclaimer.

(21) Appl. No.: 17/488,354

(22) Filed: Sep. 29, 2021

(65) Prior Publication Data

US 2022/0109397 A1 Apr. 7, 2022

(30) Foreign Application Priority Data

Oct. 2, 2020 (EP) ..................................... 20199809

(51) Int. Cl.
*F24S 25/61* (2018.01)
*F24S 25/00* (2018.01)
(Continued)

(52) U.S. Cl.
CPC .............. *F24S 25/61* (2018.05); *F24S 25/00* (2018.05); *F24S 25/13* (2018.05); *F24S 25/63* (2018.05);
(Continued)

(58) Field of Classification Search
CPC .. F24S 25/00; F24S 25/02; F24S 25/13; F24S 25/61; F24S 25/63; F24S 2025/804;
(Continued)

(56) References Cited

U.S. PATENT DOCUMENTS

| 8,695,290 B1* | 4/2014 | Kim ........................ F24S 25/67 52/843 |
| 2010/0282290 A1* | 11/2010 | Schwarze ............... F24S 25/20 136/244 |
| 2012/0298201 A1 | 11/2012 | Stephan | |
| 2013/0111713 A1 | 5/2013 | McPheeters | |

(Continued)

FOREIGN PATENT DOCUMENTS

| DE | 93 10 063 U1 | 8/1993 |
| FR | 3 087 969 A1 | 5/2020 |

(Continued)

*Primary Examiner* — Jessie T Fonseca
(74) *Attorney, Agent, or Firm* — Schmeiser, Olsen & Watts, LLP

(57) ABSTRACT

Provided is a device for supporting solar modules, including a base rail having a first receiving opening, a support, the support having a first connecting element which is arranged in the first receiving opening, and a securing rail which is arranged on the base rail so as to at least partially encompass the base rail and is movable along the base rail. The securing rail at least partially closes the first receiving opening in a second position so that a movement of the first connecting element out of the first receiving opening is prevented. The securing rail unblocks the first receiving opening in the first position in such a way that a movement of the first connecting element out of the first receiving opening is made possible. Furthermore, a kit, a method for manufacturing a device, and a solar module arrangement are provided.

15 Claims, 17 Drawing Sheets

(51) Int. Cl.
*F24S 25/13* (2018.01)
*F24S 25/63* (2018.01)
*F24S 30/20* (2018.01)
*H02S 20/24* (2014.01)
*H02S 30/10* (2014.01)

(52) U.S. Cl.
CPC .............. *F24S 30/20* (2018.05); *H02S 20/24* (2014.12); *H02S 30/10* (2014.12); *F24S 2025/02* (2018.05); *F24S 2025/804* (2018.05); *Y02E 10/47* (2013.01)

(58) Field of Classification Search
CPC ....... F24S 30/20; F24S 2025/02; H02S 20/24; H02S 30/10; Y02E 10/47
See application file for complete search history.

(56) References Cited

U.S. PATENT DOCUMENTS

| | | | | |
|---|---|---|---|---|
| 2014/0008312 | A1* | 1/2014 | Durney | H02S 20/10 |
| | | | | 211/26 |
| 2015/0372635 | A1* | 12/2015 | Praca | F24S 25/634 |
| | | | | 52/745.19 |
| 2015/0372637 | A1* | 12/2015 | Wu | H02S 30/10 |
| | | | | 136/251 |
| 2017/0353143 | A1* | 12/2017 | Stearns | F24S 25/70 |
| 2018/0187411 | A1* | 7/2018 | Shang | F24S 25/636 |
| 2021/0257960 | A1* | 8/2021 | Goorman | F24S 25/634 |
| 2021/0265939 | A1* | 8/2021 | De Bie | E04D 11/007 |

FOREIGN PATENT DOCUMENTS

| | | |
|---|---|---|
| JP | 2014175352 A | 9/2014 |
| JP | 2016205122 A | 12/2016 |
| WO | 2012/065206 A2 | 5/2012 |
| WO | 2015/069112 A1 | 5/2015 |
| WO | 2019/143701 A1 | 7/2019 |

* cited by examiner

DEVICE FOR SUPPORTING SOLAR MODULES, KIT, METHOD FOR MANUFACTURING, AND SOLAR MODULE ARRANGEMENT

CROSS-REFERENCE TO RELATED APPLICATIONS

This application claims priority to European Application No. 20199809.3, having a filing date of Oct. 2, 2020, the entire contents of which are hereby incorporated by reference.

FIELD OF TECHNOLOGY

The following relates to a device for supporting solar modules, to a kit, and to a method for manufacturing it, as well as to a solar module arrangement.

BACKGROUND

Solar modules, in particular photovoltaic modules and solar thermal collectors may be arranged free-standing or on roofs. In the case of pitched roofs, the roof indicates the orientation of the solar modules. When mounting on a flat roof and when mounting in a free-standing manner, both the orientation according to the cardinal points and the angular position with respect to the horizontal may be adapted to the circumstances, in particular the structural framework conditions, the position of the sun to be expected according to the geographical location, as well as possible shadowing by objects in the surroundings.

According to one configuration for mounting on flat roofs, solar modules are mounted on supports in the form of feet. The feet may be fixed on base rails, for example. In this context, the solar module is fastened to two upper feet which support a higher rear end of the solar module on opposite sides. The solar module extends obliquely downward from these upper supports and is fastened to the base rail at a lower front end, in particular by means of two lower feet or supports which support the front end of the solar module on opposite sides. In contrast to a linear support running along the entire solar module on inclined support surfaces or struts, a quasi-punctiform mounting is implemented with the small fastening surfaces in systems of this type. The angle of the solar module relative to the horizontal is determined in this case by the height difference and the distance between the front (lower) and the rear (upper) support surfaces. Systems of this type having front and rear feet arranged on base rails are described, for example, in WO 2015/069112 A1 and WO 2019/143701 A1.

For the construction of holding systems of this type, the supports or feet must be mounted on the base rail. Mounting the feet on the base rail during the construction of the system at the site of use is complex and usually requires additional tools. Alternatively, the feet may be pre-mounted on the base rail. For example, supports may be formed as fold-out profiles connected to a base profile.

SUMMARY

An aspect relates to improved technologies for holding systems for solar modules with which simplified mounting of solar modules is made possible on flat roofs or free-standing, in which, in particular, the supports are flexibly and easily to mountable on a base rail.

To achieve the aspect, a device for supporting solar modules is provided. Furthermore, a kit and a method for manufacturing a device for supporting solar modules as well as a solar module arrangement are provided.

According to one aspect, a device for supporting solar modules is provided. The device has a base rail having a first receiving opening, a support, arranged on the base rail, for holding one end of a solar module, the support having a first connecting element which is arranged in the first receiving opening, and a securing rail which is arranged on the base rail so as to at least partially encompass the base rail and which is movable along the base rail between a first position and a second position. The securing rail at least partially closes the first receiving opening in the second position in such a way that a movement of the first connecting element out of the first receiving opening is prevented. In the first position, the securing rail unblocks the first receiving opening in such a way that a movement of the first connecting element out of the first receiving opening is made possible.

The base rail may be formed with a profile rail. The base rail may, in particular, be formed with a cut-to-length, for example cut off or sheared off, portion of a metal profile or plastics material profile, in particular a hollow profile. In exemplary embodiments, the connecting element may be a pin or bolt which may be arranged in openings, in particular the receiving opening, of the base rail.

According to a further aspect, a kit for a device for supporting solar modules is provided with a base rail having a first receiving opening, a support for holding one end of a solar module, the support having a first connecting element, and a securing rail. In this context, the support is configured to be arranged on the base rail for manufacturing a device for supporting solar modules, and the first connecting element is configured to be arranged in the first receiving opening. The securing rail is configured to be arranged on the base rail so as to at least partially encompass the base rail and to be moved along the base rail between a first position and a second position. The securing rail at least partially closes the first receiving opening in the second position in such a way that a movement of the first connecting element out of the first receiving opening is prevented. In the first position, the securing rail unblocks the first receiving opening in such a way that a movement of the first connecting element out of the first receiving opening is made possible.

According to yet a further aspect, a method is provided for manufacturing a device for supporting solar modules. According to the method, a base rail having a first receiving opening is provided. A support for holding one end of a solar module having a first connecting element is arranged on the base rail, the first connecting element being arranged in the first receiving opening. A securing rail is arranged on and at least partially encompassing the base rail in a first position in which the securing rail unblocks the first receiving opening in such a way that a movement of the first connecting element out of the first receiving opening is made possible. The securing rail is moved along the base rail from the first position to a second position in which the securing rail closes the first receiving opening at least partially in such a way that a movement of the first connecting element out of the first receiving opening is prevented.

The steps of the method may be carried out in an order other than that specified. In particular, the securing rail may be arranged in the first position before the support is arranged on the base rail and/or at least partially in parallel therewith.

According to an additional aspect, a solar module arrangement is provided. The solar module arrangement has a first device according to the disclosure, a second device according to the disclosure, and a solar module. The first device and the second device are arranged and oriented with respect to one another in such a way that the base rail of the first device and the base rail of the second device extend substantially parallel and the support of the first device is arranged directly opposite the support of the second device. The solar module is arranged with a first side on the first device, wherein one end of the solar module is held in the region of the first side by the support of the first device and is arranged on the second device with a second side opposite the first side, wherein the end of the solar module is held in the region of the second side by the support of the second device. The securing rail of the first device and the securing rail of the second device are respectively arranged in the second position such that the first receiving opening of the base rails of the first and the second device are each at least partially closed and a movement of the respective first connecting element of the first and the second device out of the respective first receiving opening is prevented.

A substantially parallel course of base rails of the first and second devices means a parallel course of the base rails within the scope of the usual mounting tolerances when mounting solar modules. An arrangement of the support of the first device directly opposite the support of the second device may, in particular, mean that a straight line extending perpendicular to the base rails of the first and the second devices through a point of the support of the first device also extends through the same point of the support of the second device, or it extends at only a small distance from this point. The substantially parallel arrangement of base rails and the arrangement of supports directly opposite one another is fulfilled, in particular, if an arrangement of a plurality of solar modules next to and along base rails one after the other is made possible without interferences, for example collisions or overlaps, occurring between the respective frames of the solar modules.

A solar module within the meaning of the disclosure may, in particular, be a photovoltaic module or a solar thermal collector.

The device may be formed with a securing element which is configured to secure the securing rail in the second position in such a way that a movement of the securing rail from the second position to the first position is prevented. Thus, the securing rail is movable between the first and second positions, the movement being limited or prevented by the securing element so that the first connecting element is not unblocked by moving the securing rail far enough from the second position for unblocking the first connecting element.

The securing element may be movable without tools between a securing position, in which a movement of the securing rail from the second position to the first position is prevented, and an unblocking position, in which a movement of the securing rail from the second position to the first position is possible. In the sense of the disclosure, "without tools" means that a movement of the securing element between the securing position and the unblocking position is possible without a user having to use a tool, i.e., in particular may be possible with the bare hand.

For example, it may be provided that the securing element is formed with a latching element which, in the securing position, engages in a corresponding recess in the securing rail, in particular resiliently. Alternatively, the latching element may be arranged on the securing rail and engage in a corresponding recess on another element of the device, for example the base rail. In the unblocking position, the latching element is moved out of the associated recess. In this context, the locking element may prevent the movement of the securing rail in the securing position, wherein the securing may be overcome by applying a force which is above a specific threshold value, the latching element then moving out of the associated recess to the unblocking position and a movement of the securing rail being made possible. In particular, it may be provided to apply a corresponding force by means of a strong pull on the securing rail in the direction of the first position. Latching elements may be provided with resilient noses, pressure pieces, or spring pins, for example.

Alternatively, the securing element may be a connecting element that may be inserted without tools, for example a securing pin or a wing screw to be inserted into a corresponding opening.

In alternative configurations, it may be provided that the securing rail is fixed in the second position using a tool. For example, the securing rail may be secured in the second position by screwing, riveting, gluing, or welding.

The securing rail may be formed with a connecting rail which is configured to connect the base rail to a further base rail of a further device. In particular for the formation of a holding system for solar modules, the use of elements that are already present may be made possible by a corresponding adaptation of the connecting rail. As a result, a more compact system may be provided which allows for simplified handling.

The support may have a plurality of first connecting elements. For example, the support may have two first connecting elements which are designed as pins, for example, and which extend away from the support in opposite directions transversely to an extension direction of the base rail. In this case, the first receiving opening may extend through opposite walls of the base rail so that the two first connecting elements each come to rest on a wall of the base rail when the first connecting elements are arranged in the first receiving opening, and thus support the support on both sides of the base rail.

In general, a connecting element in the sense of the disclosure may be provided as a separate component which is arranged and fixed on other components, for example a support or a support element. Alternatively, a connecting element may be part of the component, for example a protrusion of such a component, and may thus be arranged on the relevant component already during the manufacturing process.

The first receiving opening may be open at least to an upper side of the base rail and the securing rail in the second position may at least partially cover the first receiving opening on the upper side of the base rail. For example, the receiving opening may be designed as an upwardly open recess in the base rail which extends over the entire width of the base rail and into which connecting elements extending transversely to a direction of extension of the base rail may be inserted from above. Alternatively, a receiving opening having a laterally limited opening may be formed in an upper side of the base rail, for example with a bore in the upper side of the base rail. In embodiments of this type, for example vertically extending connecting elements, such as vertically arranged pins, may be inserted or plugged into the receiving opening from above. As a further alternative, a receiving opening open to one side of the base rail may be provided, which may be configured analogously to the embodiments having an upwardly opening receiving opening, wherein corresponding connecting elements may be introduced into the receiving opening from the corresponding side of the base rail.

The base rail may have a second receiving opening. The support may be configured to be arranged with the first connecting element in the first receiving opening or in the second receiving opening. In this context, the securing rail may close the second receiving opening in the second position at least partially in such a way that a movement of the first connecting element out of the second receiving opening is prevented. Alternatively, or additionally, the securing rail may be moved along the base rail into a third position in which the securing rail closes the second receiving opening at least partially in such a way that a movement of the first connecting element out of the second receiving opening is prevented. In different embodiments, the securing rail may at least partially close or open the first receiving opening in the third position. The securing rail may be secured in the third position by means of a securing element. In this context, the embodiments explained in connection with the securing of the securing rail in the second position may be provided accordingly. The securing rail may be secured both in the second and in the third position. The securing in the second and in the third position may be provided with the same securing element or with different securing elements.

The support may be arranged in a first holding position in which the support is configured to hold a solar module at a first angle relative to the base rail when the first connecting element is arranged in the first receiving opening. When the first connecting element is arranged in the second receiving opening, the support may be arranged in a second holding position in which the support is configured to hold a solar module at a second angle relative to the base rail, the second angle being different from the first angle.

The support may be formed with a first support element and a second support element which are movably connected to one another in such a way that the first support element is movable relative to the second support element between a first position and a second position. It may be provided that the support extends up to a first height above the base rail when the first support element is arranged in the first position and extends up to a second height above the base rail when the first support element is arranged in the second position, the second height being different from the first height.

A height of the support above the base rail may, in particular, be defined by a spacing from an upper side of the base rail to an uppermost point of the support above the upper side of the base rail, the upper side of the base rail and the uppermost point of the support being defined with respect to a horizontal orientation of the base rail on or above a substrate of the device, for example a floor or a flat roof. In the case of a solar module arranged at an angle relative to the horizontal, the upper end of the solar module may be defined by the uppermost edge of the solar module, the uppermost edge of the solar module being defined with respect to a horizontal orientation of the base rail on or above a ground of the device.

The first support element and the second support element may be designed identically and connected to one another to form the upper support. For example, the first support element and the second support element may have the same shape and may be arranged rotated relative to one another by an angle of 180 degrees about a longitudinal axis and may be connected to one another, for example at a hinge point.

The support may have a second connecting element. In particular, it may be provided that the first connection element is arranged on the first support element and the second connection element is arranged on the second support element. The second connecting element may be arranged in a stationary manner in a further receiving opening in the base rail. In this case, a stationary arrangement of the second connecting element within the meaning of the disclosure means that the second connecting element is non-displaceable with respect to the base rail, i.e., does not to move in a translatory manner. A rotation of the second connecting element may thus be made possible. The second connecting element may be secured in the further receiving opening by means of the securing rail or by means of a further securing rail. In this context, the embodiments explained in connection with the securing of the first connecting element may be provided accordingly. The support may have a plurality of second connecting elements arranged on the second support element. The embodiments explained with regard to the plurality of first connecting elements may be provided correspondingly for the plurality of second connecting elements.

Support structures for supporting a solar module may be formed using the support elements of the device. The support elements may, in particular, be formed as cast parts, for example made of cast metal, i.e., cast aluminum. Alternatively, the support elements may be formed with cut-to-length profiles. In this case, the support elements may be reworked, in particular by deburring.

In alternative embodiments, the support may not be movable in itself and an angular adjustment of a solar module to be arranged on the device may be carried out by positioning a lower of the support on the base rail and/or by positioning an upper side of the support in the region of the solar module.

The support may be an upper support for holding an upper end of a solar module. The upper support may be configured to hold an upper end of a solar module at different angles of the solar module with respect to the base rail. Alternatively, the upper support may be configured to hold an upper end of a solar module at a single angle of the solar module with respect to the base rail. In this context, the upper support may be adjustable for different angles of the solar module and/or may be arranged on the base rail for different angles of the solar module or it may be a support configured for a predetermined angle.

Additionally, the device may have a lower support arranged on the base rail for holding a lower end of a solar module. The lower support may be configured to hold a lower end of a solar module at different angles of the solar module with respect to the base rail. Alternatively, the lower support may be configured to hold a lower end of a solar module at a single angle of the solar module with respect to the base rail. In this context, the lower support may be adjustable for different angles of the solar module and/or may be arranged on the base rail for different angles of the solar module. With the lower support and the upper support, the arrangement may be configured to form a holding system for solar modules with high and low feet.

The upper and lower supports may each have one or more connecting elements for arrangement in one or more corresponding receiving openings in the base rail. In this context, the various embodiments explained in connection with the support of the device may each be provided for one or both of the upper support and the lower support. The upper and lower supports may be secured with the securing rail. Alternatively, one of the upper and lower supports may be secured with the securing rail and the other of the upper and lower supports may be secured with a further securing rail, wherein the embodiments explained in connection with the securing rail may be provided accordingly for the further securing rail.

In alternative configurations, the support may be a lower support for holding a lower end of a solar module and the device may additionally have an upper support for holding an upper end of a solar module which cannot be secured by means of the securing rail.

The base rail may be configured to receive and to route a cable of a solar module. For this purpose, the base rail may have one or a plurality of cable receiving devices. For example, cable receiving devices may, for example, be formed with channels for routing cables, in particular along the course of the base rail. By receiving and routing the cable in the base rail, in particular in one or a plurality of cable receiving devices, the cable may be protected from damage, in particular against damage from sharp edges of the base rail or of other components of the device. As a result, cables may be laid quickly and safely even when profile rails cut to length are used in the device. The base rail may be configured to receive and route a plurality of cables.

One or a plurality of cable receiving devices may be formed using the base rail itself. In particular, a profile forming the base rail may be designed in such a way that it allows cable routing. For example, the base rail may have the shape of a cable duct. The spacing between an inner rail base and other overlying elements such as pins or supports may be dimensioned so that a plug connector, in particular a plug connector corresponding to a corresponding standard, of a cable of a solar module may be moved through a free space formed by the spacing. The base rail may be configured to receive a plurality of cables. In particular, the base rail may be dimensioned for receiving a plurality of cables.

In addition to a structural function in the device, the base rail may thus also assume the function of a cable duct. As a result, the need to provide additional devices for cable routing may be eliminated. A reduction in costs may thus be achieved, in particular by reducing production costs, logistics, and installation costs.

Furthermore, the securing rail and/or a connecting rail, in particular a securing rail formed with a connecting rail, may be configured to receive and route a cable of a solar module. The embodiments set out above regarding the configuration of the base rail for receiving and routing a cable of a solar module may in this case be provided accordingly.

The disclosure provides, independently from the remaining configuration of the device, a base rail and a securing rail for a holding system for solar modules for a solar module arrangement or for a device for supporting solar modules, the rails being configured to receive and route a cable of a solar module. In this case, the above embodiments regarding the adapting of the base rail of the device for receiving and routing a cable apply accordingly.

The base rail may be configured for arranging one side of a ballast holding device thereon in such a way that the ballast holding device rests at least in sections on the base rail, and the support may be configured to be arranged at least in sections in at least one opening of the ballast holding device when the latter rests at least in sections on the base rail, the support being shaped in such a way that in this case it substantially prevents an upward movement of the ballast holding device. With the shaping of the support, a positive fit between the support and the ballast holding device is established in an upward direction of movement of the ballast holding device, at least to the extent that an upward movement of the ballast holding device is substantially prevented. The shaping of the support may be such that it is unable to prevent the movement of the ballast device in other directions. Alternatively, the shaping of the support may also prevent the movement of the ballast device in other directions. An upward movement of the ballast holding device is substantially prevented if the ballast holding device is unable to move so far upward that it may be removed from the base rail, in particular due to the action of the wind. A slight play in the form of a movement of the ballast holding device relative to the base rail, which does not impair the securing of the position of the ballast holding device on the base rail, may be possible in this case.

A shaping of the support may substantially prevent an upward movement of the ballast holding device by providing an enlarged profile of the support above the ballast device. Alternatively, or in addition, the support above the ballast holding device may not extend straight upward. For example, the support may extend obliquely at least above the ballast holding device, so that an upward movement of the ballast holding device is substantially prevented at least if at the same time a forward and/or backward movement of the ballast holding device in the direction of extension of the base rail is prevented, so that the ballast holding device is unable to follow the course of the support.

The ballast holding device may be a ballast trough or ballast rail, which has a recess for receiving ballast and a bearing edge which is configured to be arranged on the base rail. The at least one opening of the ballast holding device may be formed with a cutout in the support edge which opens to a lateral edge of the ballast holding device. The cutout may encompass the support. In this case, edges of the cutout in the direction of extension of the base rail may rest against the support at the front and rear, so that a forward and backward movement of the ballast holding device is substantially prevented.

In general, more than the number of different elements explicitly mentioned may be provided. For example, further receiving openings, further positions of the securing rail and/or further positions may be provided in addition to the first and the second position of a first support element.

The disclosure provides an arrangement for a device for supporting solar modules, having a base rail, a support arranged on the base rail for holding an end of a solar module, and a ballast device for receiving ballast, one side of the ballast holding device being arranged on the base rail in such a way that the ballast holding device rests at least in sections on the base rail, and such that the support is arranged at least in sections in at least one opening of the ballast holding device, the support being shaped in such a way that an upward movement of the ballast holding device is substantially prevented in this case. In connection with such a device, the above embodiments regarding the ballast holding device and the arrangement thereof in a device for supporting solar modules with a securing rail may apply accordingly.

The solar module arrangement may additionally have a third device according to the disclosure, a fourth device according to the disclosure, and a further solar module. In this context, the third device may be arranged and oriented behind the first device in such a way that a longitudinal axis of the base rail of the first device and a longitudinal axis of the base rail of the third device are substantially superimposed. The fourth device may be arranged and oriented behind the second device in such a way that a longitudinal axis of the base rail of the second device and a longitudinal axis of the base rail of the fourth device are substantially superimposed. The third device and the fourth device may be arranged and oriented with respect to one another in such a way that the support of the third device is arranged directly opposite the support of the fourth device. The further solar module may be arranged with a first side on the third device, wherein one end of the further solar module is held in the region of the first side by the support of the third device and may be arranged with a second side opposite the first side on the fourth device, wherein the end of the further solar module is held in the region of the second side by the support of the fourth device. In this context, the securing rail of the first device may be arranged in the second position at least partially encompassing the base rail of the first device with a first end of the securing rail of the first device and may be arranged on and at least partially encompassing the base rail of the third device with a second end of the securing rail of the first device opposite the first end. The securing rail of the second device may be arranged in the second position at least partially encompassing the base rail of the second device with a first end of the securing rail of the second device and may be arranged on and at least partially encompassing the base rail of the fourth device with a second end of the securing rail of the first device opposite the first end. An arrangement of components one after the other is defined according to the longitudinal course of the base rail or base rails, a front end of a base rail being an end opposite a rear end along the course of the base rail.

In alternative configurations, the third device and the fourth device may be modified devices in which the further solar module is arranged with a first side on the third device, wherein one end of the further solar module is held in the region of the first side—like the solar module—by the support of the first device, and may be arranged with a second side opposite the first side on the fourth device, wherein the end of the further solar module is held in the region of the second side—like the solar module—by the support of the second device. In this context, the securing rail of the first device may be arranged in the second position at least partially encompassing the base rail of the first device with a first end of the securing rail of the first device and may be arranged on the base rail of the third device with a second end of the securing rail of the first device opposite the first end at least partially encompassing the base rail. The securing rail of the second device may be arranged in the second position at least partially encompassing the base rail of the second device with a first end of the securing rail of the second device and may be arranged on the base rail of the fourth device with a second end of the securing rail of the first device opposite the second end at least partially encompassing the base rail. The third and fourth devices may each have a support on which additional solar modules may be arranged accordingly.

The solar module arrangement may have one or a plurality of further support devices which are arranged between corresponding support devices, for example with base rails oriented parallel to the base rails of one or a plurality of the mentioned support devices and may support the solar module centrally. The solar module arrangement may furthermore have any number of additional support devices.

In general, two solar modules may be arranged next to one another in a solar module arrangement according to the disclosure, one solar module being arranged with a first side on a support device, in particular a device for supporting solar modules according to the disclosure, and a further solar module being arranged with a second side on the same support device. In this context, the respective other side of the solar modules may each be arranged on a respective further support device, which may form a lateral end of the solar module arrangement or on which in turn a side of further solar modules may be respectively arranged.

Two solar modules may be arranged one after the other in a solar module arrangement, wherein an inclination of the solar modules may be sloping downward in the same or in opposite directions. In the case of an equally oriented inclination, a respective upper end of the solar modules may be held by a respective upper support. If the solar modules are inclined in opposite directions, a respective upper end of both solar modules may be held by the same upper support.

In a solar module arrangement, an arrangement of solar modules may be provided both next to one another and one after the other, it being possible for the embodiments of such arrangements described above to be provided accordingly. In an arrangement of two solar modules next to one another and two further solar modules one after the other with opposite inclination, the four solar modules may be held by the same upper support, in particular in a respective corner region.

A support device of the solar module arrangement, in particular a device for supporting solar modules according to the disclosure, may be configured to hold a respective upper end of each of up to four solar modules in the region of one side. For this purpose, the support of the support device may have one or a plurality of stop elements against which solar modules, in particular frame profiles of solar modules, may be placed for mounting on the support device. A stop for an upper edge and/or for a respective side edge of each of four solar modules may, in particular, be formed with the one or the plurality of stop elements. Alternatively, or in addition, the upper support of the support device may have fastening elements, for example clamping elements and/or screw elements, for respectively fastening an upper end of up to four solar modules in each case.

With regard to the kit, the method for manufacturing a device for supporting solar modules and/or the solar module arrangement, the configurations described in connection with the device for supporting solar modules may be provided accordingly, and vice versa.

A ballast holding device may, in particular, be provided in the solar module arrangement, the ballast device being arranged with a first side on the first device and with a second side opposite the first side on the second device, wherein, in connection with the ballast holding device, the configurations described in connection with the device may be provided accordingly for the first device and for the second device respectively in relation to one side of the ballast holding device. Alternatively, or in addition, it may be provided that at least one of the base rail of the first device and the base rail of the second device is configured, in accordance with the described configurations, to receive and route one or a plurality of cables of a solar module.

Alternatively, or in addition to the embodiments described, the support device in one embodiment may be formed with a water drainage system in the region of the base rail and of the securing rail. For this purpose, drainage grooves may be provided in the bottom region of the base rail, the grooves extending in the longitudinal direction of the base rail and serve to drain water, in particular rainwater. If cables are inserted in the base rail, this prevents the cables from lying in the water. The water that runs off or is drained from the base rail via the drainage grooves may then reach the underlying securing rail and may be drained to the outside along recesses formed on the securing rail in the bottom region. Drainage channels are formed by means of the recesses and the base of the securing rail arranged there above.

In a further embodiment, it may be provided, as an alternative or in addition to the embodiments described, that the lower support is formed with a support component pivotably mounted on the base rail. The support or holding component provides a support surface on which the solar module is to be placed, wherein a spacer pin may be arranged on support surfaces formed next to one another, the spacer pin forming a stop for the solar modules to be arranged on both sides. The holding component is mounted on the base rail so as to be pivotable about a pivot axis, the axis extending transversely relative to the longitudinal direction of the base rail. Holding claws may encompass the base rail on opposite sides and at a distance from the base rail so that a shear rail or securing rail may be pushed into the spacing region between the base rail and the holding claw. When the holding component is pivoted about the pivot axis, the holding claws may be released from engagement (by pivoting upwards). The pivotable mounting of the holding component allows for a continuous adjustment to different angles of inclination of the solar module.

BRIEF DESCRIPTION

Some of the embodiments will be described in detail, with references to the following Figures, wherein like designations denote like members, wherein.

DETAILED DESCRIPTION

Figure 1:
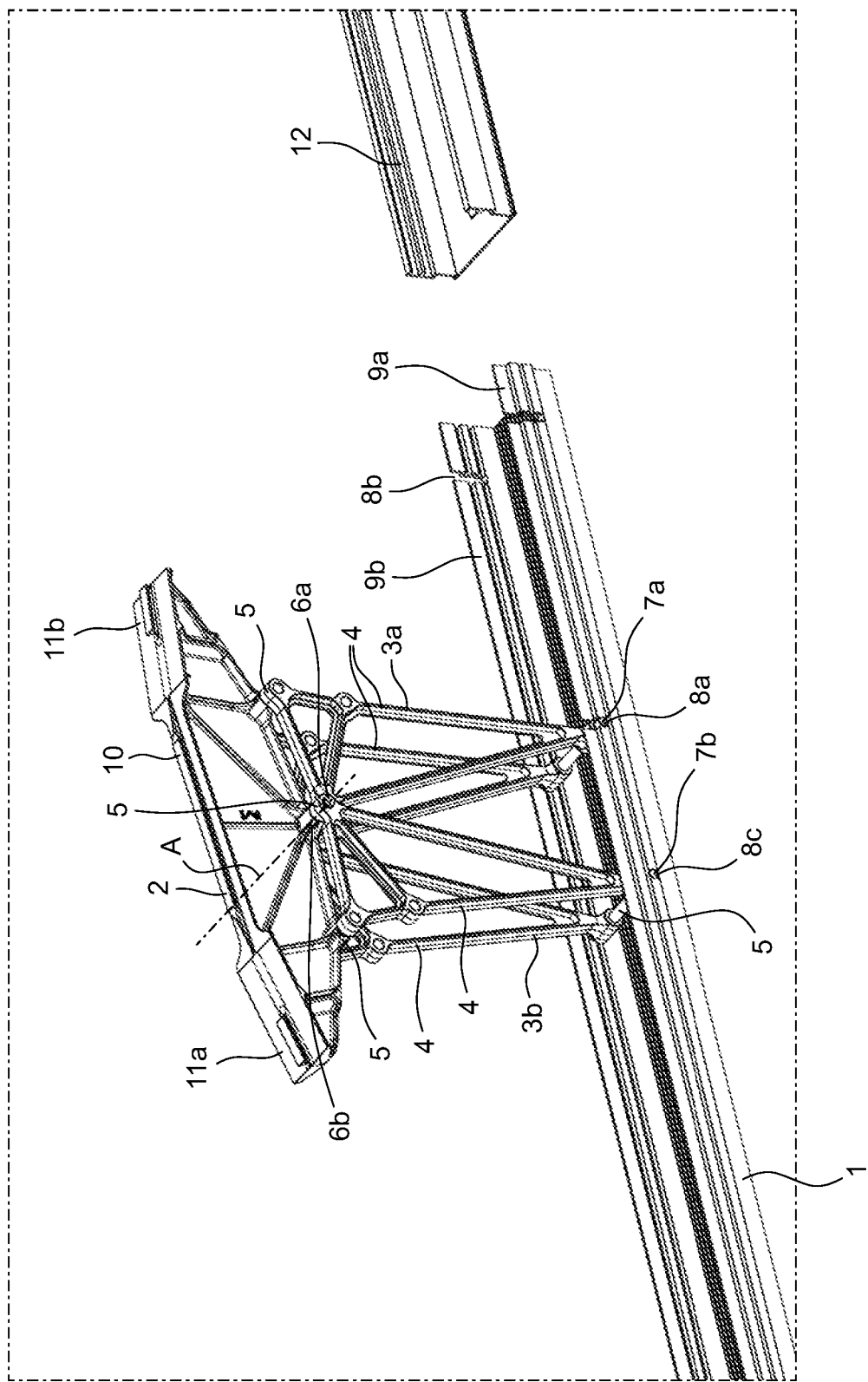
FIG. 1 shows a device for supporting solar modules in an unsecured configuration.

FIG. 1 shows a device for supporting solar modules. The device is formed with a base rail 1. An upper support 2, which is used to hold an upper end of a solar module on one side of the solar module, is arranged on the base rail 1.

The upper support 2 is height-adjustable. For this purpose, the support is formed with two support elements 3a, 3b. In the exemplary embodiment in FIG. 1, each of the support elements 3a, 3b is formed with two cast metal parts 4, which are connected to one another by cylindrical pins 5. In the embodiment shown, the four cast metal parts 4 are structurally identical.

The support elements 3a, 3b are connected to one another by means of a cylindrical pin 5 at two hinge points 6a, 6b situated on a hinge axis A, allowing a rotation about the hinge axis A. As a result, the support elements 3a, 3b may be pivoted relative to one another. At a respective lower end of the support elements 3a, 3b, the cylindrical pins 5 are each formed with two connecting elements 7a, 7b, which protrude laterally from the support elements 3a, 3b.

The connecting elements 7a, 7b may be arranged in receiving openings 8a, 8b, 8c of the base rail 1. In this case, a first receiving opening 8a and a second receiving opening 8b of the base rail, which form one elongated hole shape each in opposite side walls 9a, 9b of the base rail 1, are each formed as a gap that penetrates the base rail 1 over the entire width thereof and is open to an upper side of the base rail. The connecting elements 7a of a first support element 3a may be inserted from above into the first receiving opening 8a or into the second receiving opening 8b. The respective position of the lower end of the first support element 3a along the course of the base rail 3 is thereby defined. In the device according to FIG. 1, the first connecting elements 7a are arranged in the first receiving opening 8a.

A further receiving opening 8c of the base rail 1 is formed as a gap having a circular cross section, which gap penetrates the entire width of the base rail 1 and forms circular bores in the opposite side walls 9a, 9b of the base rail 1. The connecting elements 7b of a second support element 3b are rotatably arranged in the further receiving opening 8c. In the embodiment shown, the connecting elements 7b of the second support element 3b are formed as pin ends arranged in, and protruding from, the relevant cylindrical pin 5, which engage into the further receiving opening 8c and which fix the lower end of the second support element 3b in a stationary manner along the direction of extension of the base rail 1.

Figure 2:
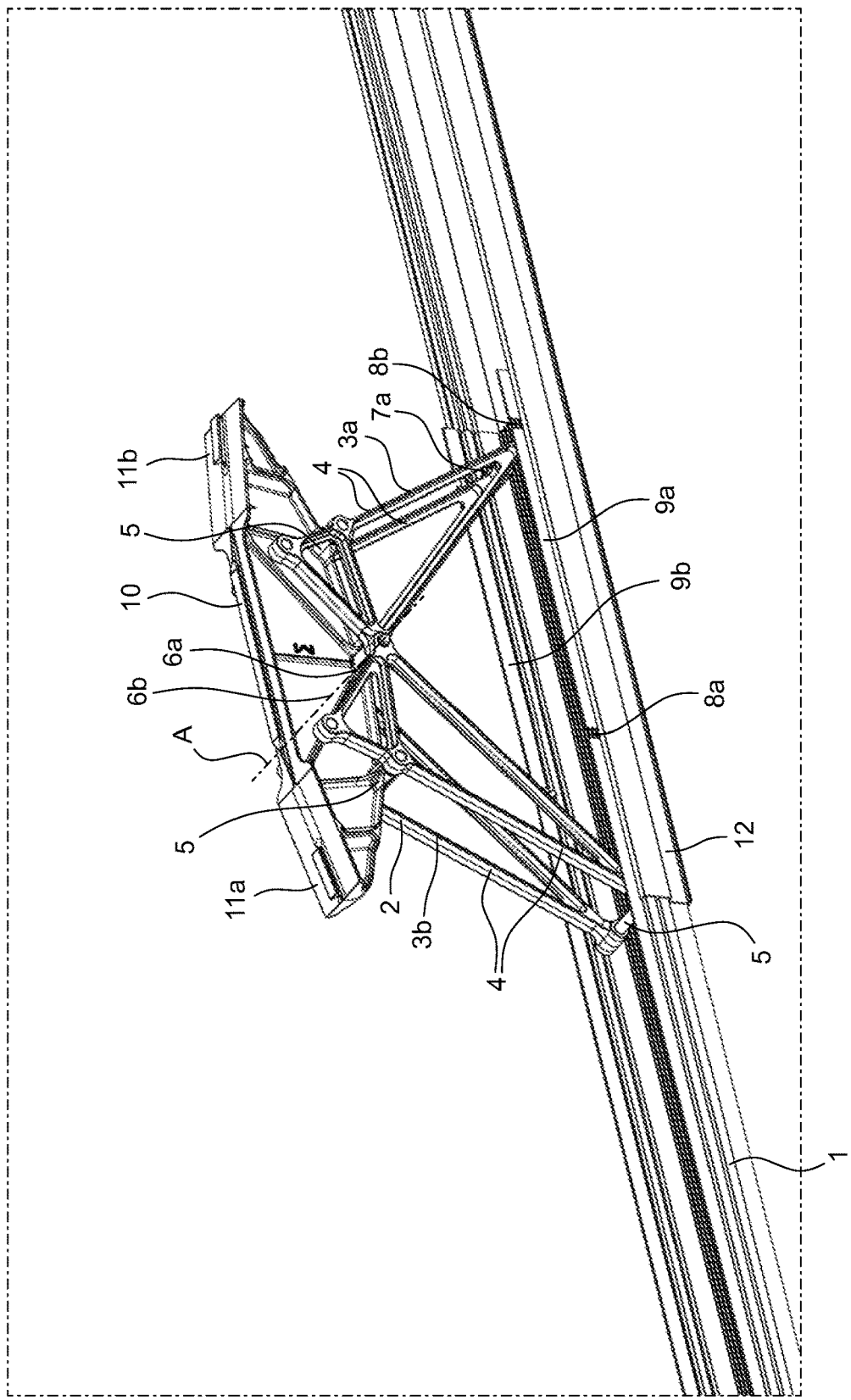
FIG. 2 shows another device for supporting solar modules in a secured configuration.

FIG. 2 shows a device for supporting solar modules, in which, compared to the configuration in FIG. 1, the connecting elements 7a of the first support element 3a are arranged in the second receiving opening 8b of the base rail 1. As a result, the first support element 3a and the second support element 3b are pivoted with respect to the configuration shown in FIG. 1 and a distance between the lower ends of the first support element 3a and the second support element 3b, which is determined by the spacing between the first connecting elements 7a and the second connecting elements 7b, is increased. The height of each triangle above the base rail 1, which is formed by the first connecting elements 7a, the second connecting elements 7b, and the hinge points 6a, 6b, is thus reduced. This results in a lower overall height of the upper support of the configuration of FIG. 2 compared to the upper support of the configuration shown in FIG. 1. In addition, a support point for a solar module shifts relative to the base rail 1. As a result, for a solar module the upper end of which is held on the respective upper support 2 and the lower end of which is at the height of the respective base rail 1, a different angle with respect to the horizontal is achieved between the configurations of FIGS. 1 and 2.

When comparing the representations in FIGS. 1 and 2, it is apparent that, depending on the arrangement of the first connecting elements 7a in the first 8a or second 8b receiving opening, the cylindrical pins 5 arranged along the course of the base rail 1 in front of and behind the hinge points 6a, 6b come into contact with different openings of the cast metal parts 4 of the first 3a and second 3b support element. In this case, the relevant pins 5 are secured in the corresponding openings for additional stabilization of the upper support 2.

The upper support 2 has a holding device 10 which, for holding a respective solar module, has two support surfaces 11a, 11b on which one or a plurality of solar modules may be placed and fixed. The support surfaces 11a, 11b are arranged at an angle to a central section of the holding device 10 in order to support a solar module at an angle to the horizontal. Stops are formed on each of the support surfaces 11a, 11b, against which solar modules to be arranged on the holding device 10 may be placed laterally in order to orient them, in particular with respect to a frame structure of the solar modules. It is therefore apparent that in the embodiment shown, the holding device 10 is configured to hold four solar modules, namely two solar modules each arranged laterally next to one another on each of the bearing surfaces 11a, 11b.

As may be seen in the comparison of FIGS. 1 and 2, the first receiving opening 8a and the second receiving opening 8b have different depths from the top of the base rail 1. As a result, the first connecting elements 7a and the second connecting elements 7b are arranged at the same height when the first connecting elements 7a are arranged in the second receiving opening 8b, as shown in FIG. 2. If the first connecting elements 7a are arranged in the first receiving opening 8a, the first connecting elements 7a are situated higher than the second connecting elements 7b. As a result, the holding device in the configuration according to FIG. 1 is angled with respect to a horizontal orientation of the middle section, which is set in the configuration according to FIG. 2. A different angle with respect to the horizontal of the support surface 11a in the different configurations is thereby achieved. In the exemplary configuration of FIG. 1, an angle of the support surface 11a with respect to the horizontal, and thus the angle with respect to the horizontal at which a solar module is arranged flat on the support surface 11a, is 15 degrees. According to the exemplary embodiment in FIG. 2, the angle of the support surface 11a with respect to the horizontal, and thus the bearing angle of a solar module, is 10 degrees.

The cylindrical pin 5 arranged on the hinge axis A and the cylindrical pins 5 arranged along the course of the base rail 1 in front of and behind the hinge points 6a, 6b are arranged in openings of the holding device 10 configured for this purpose. As a result, by securing the cylindrical pins 5 arranged in front of and behind the hinge points 6a, 6b along the course of the base rail 1 in the corresponding openings of the cast metal parts 4 in the various positions of the support elements 3a, 3b, a securing of the position and orientation of the holding device 10 may additionally be achieved.

In the configuration shown, the second connecting elements 7b are pre-mounted in a fixed position in the further receiving opening 8c in the delivery state of the device. In order to prepare the device for supporting a solar module, the first connecting elements 7a are arranged in the first 8a or the second 8b receiving opening. In the embodiment shown, securing the cylindrical pins 5 arranged in front of and behind the hinge points 6a, 6b takes place in the corresponding openings of the cast metal parts 4 only after the first connecting elements 7a have been arranged in the first 8a or the second 8b receiving opening, since it is necessary during the arrangement of the first connecting elements 7a in the first 8a or the second 8b receiving opening for the support elements 3a, 3b to be movable relative to one another.

A securing rail 12 is shown in FIG. 1 behind the base rail 1 along the course of the base rail 1. The securing rail 12 is formed with a connecting rail, which is configured to connect a plurality of arrangements one behind the other. The securing rail 12 is formed with a profile which is adapted to the outer shape of the base rail 1 in such a way that the securing rail 12 encompasses the base rail 1 from below, partially covering the side walls 9a, 9b of the base rail 1. For this purpose, the securing rail 12 is pushed onto the base rail 1. This is shown in FIG. 2.

The securing rail 12, when it is pushed onto the base rail 1, partially covers and closes the first 8a and second 8b receiving openings. In this case, a first position (not shown) of the securing rail 12 is defined, in which the securing rail is partially pushed onto the base rail 1, does not yet cover, and does not yet close the first 8a and second 8b receiving openings. In a second position of the securing rail 12 shown in FIG. 2, the latter is pushed so far onto the base rail 1 that it partially covers and closes the first 8a and the second 8b receiving opening. As a result, the first connecting elements 7a are prevented from moving out of the receiving opening 8a, 8b in which they are arranged (i.e., from the second receiving opening 8b in the embodiment of FIG. 2). As a result, a securing of the upper support, in particular the first support element 3a, in a desired position is achieved.

On the inside of the securing rail 12, respective projections are formed so that the securing rail 12 may encompass and secure the connecting elements 7a both in the higher arrangement in the first receiving opening 8a and in the lower arrangement in the second receiving opening 8b.

The securing rail 12 may be locked in the second position. For example, latching elements may be provided between the base rail 1 and the securing rail 12, on which the securing rail 12 is secured in the second position in a latching manner. For example, the first 7a and/or the second 7b connecting elements may be formed with resilient or resiliently movable pin elements, which engage for securing purposes in corresponding gaps on the inside of the securing rail 12. Alternatively, the securing rail 12 may be secured to the base rail 1 in the second position, for example by means of pins to be inserted, by screwing, gluing, or welding.

Figure 3:
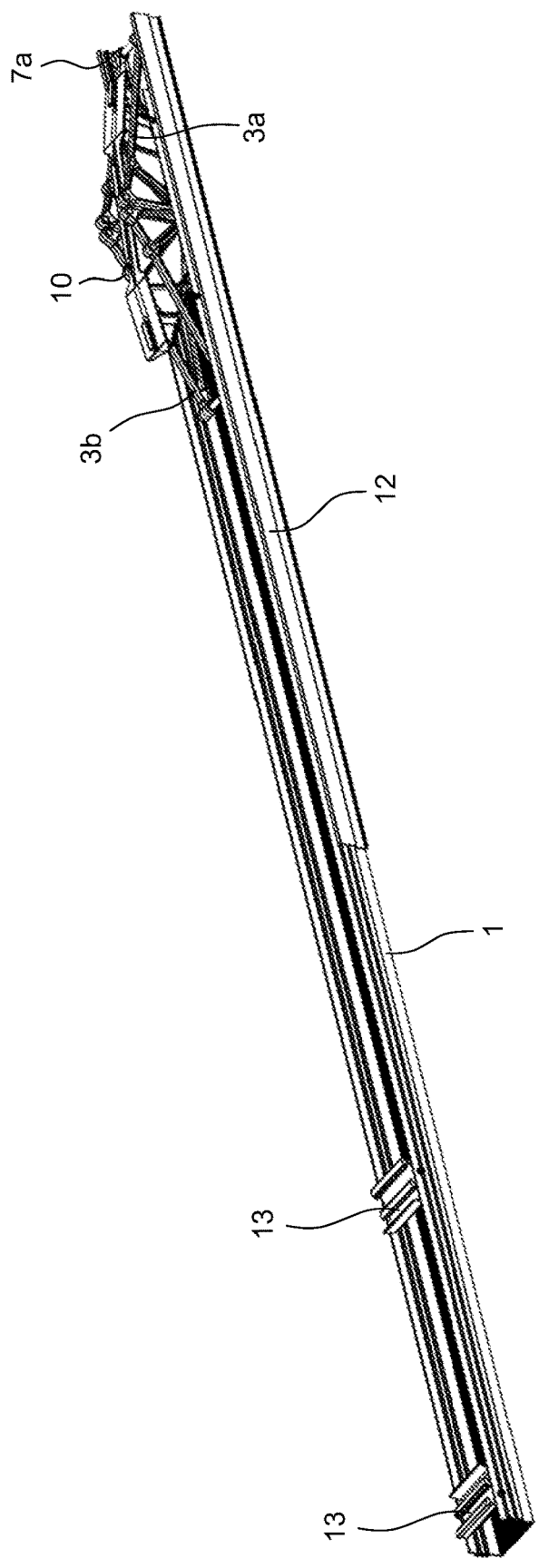
FIG. 3 shows yet another device for supporting solar modules in a transport configuration.

FIG. 3 shows an arrangement for a holding system for solar modules in a transport configuration. In this case, the first connecting elements 7a are moved completely backward, as a result of which the first support element 3a is arranged relative to the second support element 3b in such a way that the upper support 2 is completely collapsed. In this case, the support elements 3a, 3b are arranged substantially within the base rail 1. The support elements 3a, 3b and the holding device 10 still in fact protrude upward beyond the profile of the base rail. Nevertheless, a significantly more compact structure is achieved, as a result of which a transport of the arrangement in the transport configuration may be facilitated. The connecting rail forming the securing rail 12 is arranged almost completely above the base rail 1 in the transport configuration. In this case, the first connecting elements 7a are arranged outside, namely behind, the base rail 1 and are encompassed by a section of the securing rail 12 protruding beyond the base rail 1. As a result, the connecting elements 7a and thus the upper support 2 are secured in the transport configuration. In addition, lower supports 13 are arranged on the base rail 1, each of which is configured to hold a lower end of a solar module.

Figure 4A:
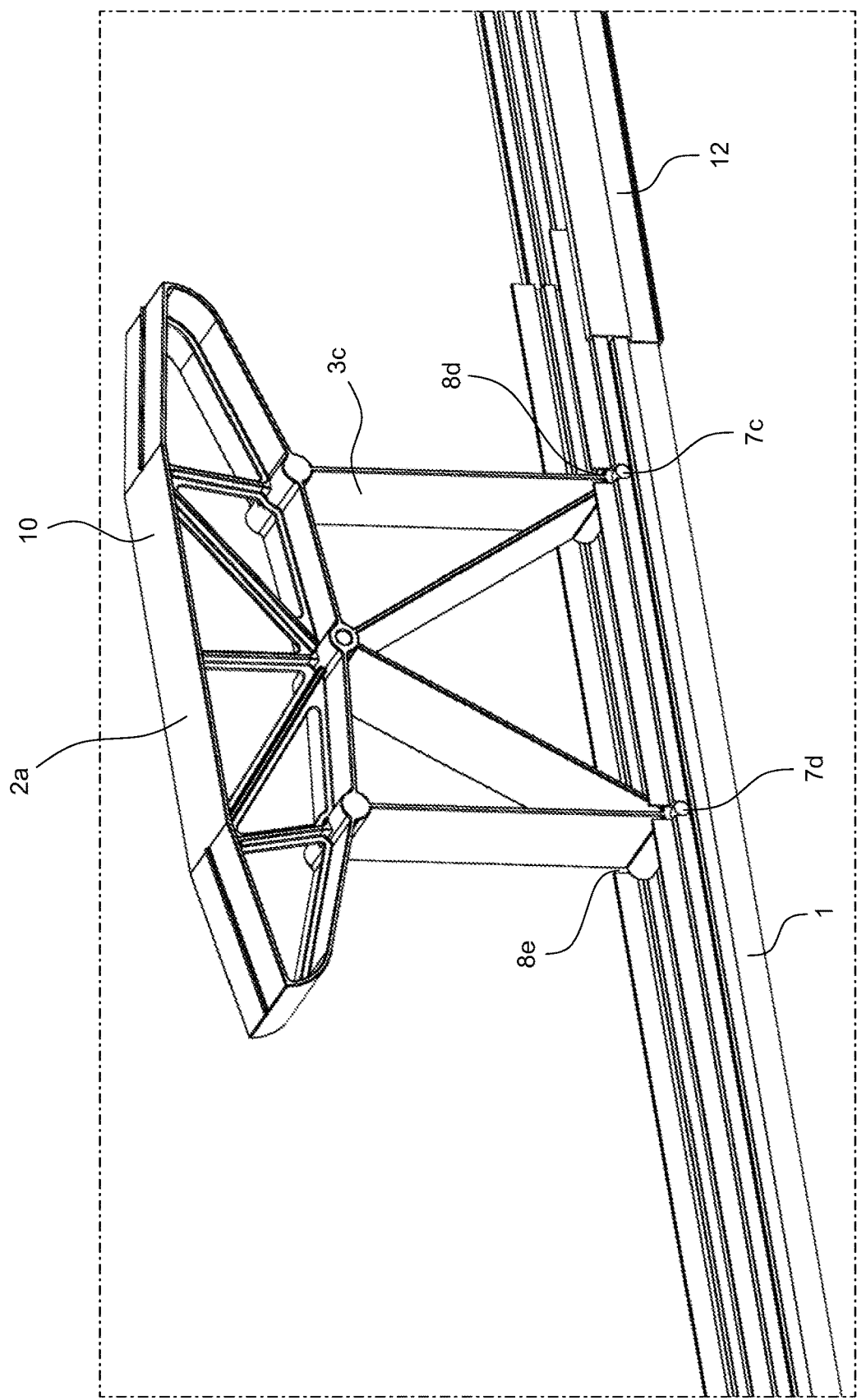
FIG. 4A shows a device for supporting solar modules having a low upper support.
Figure 4B:
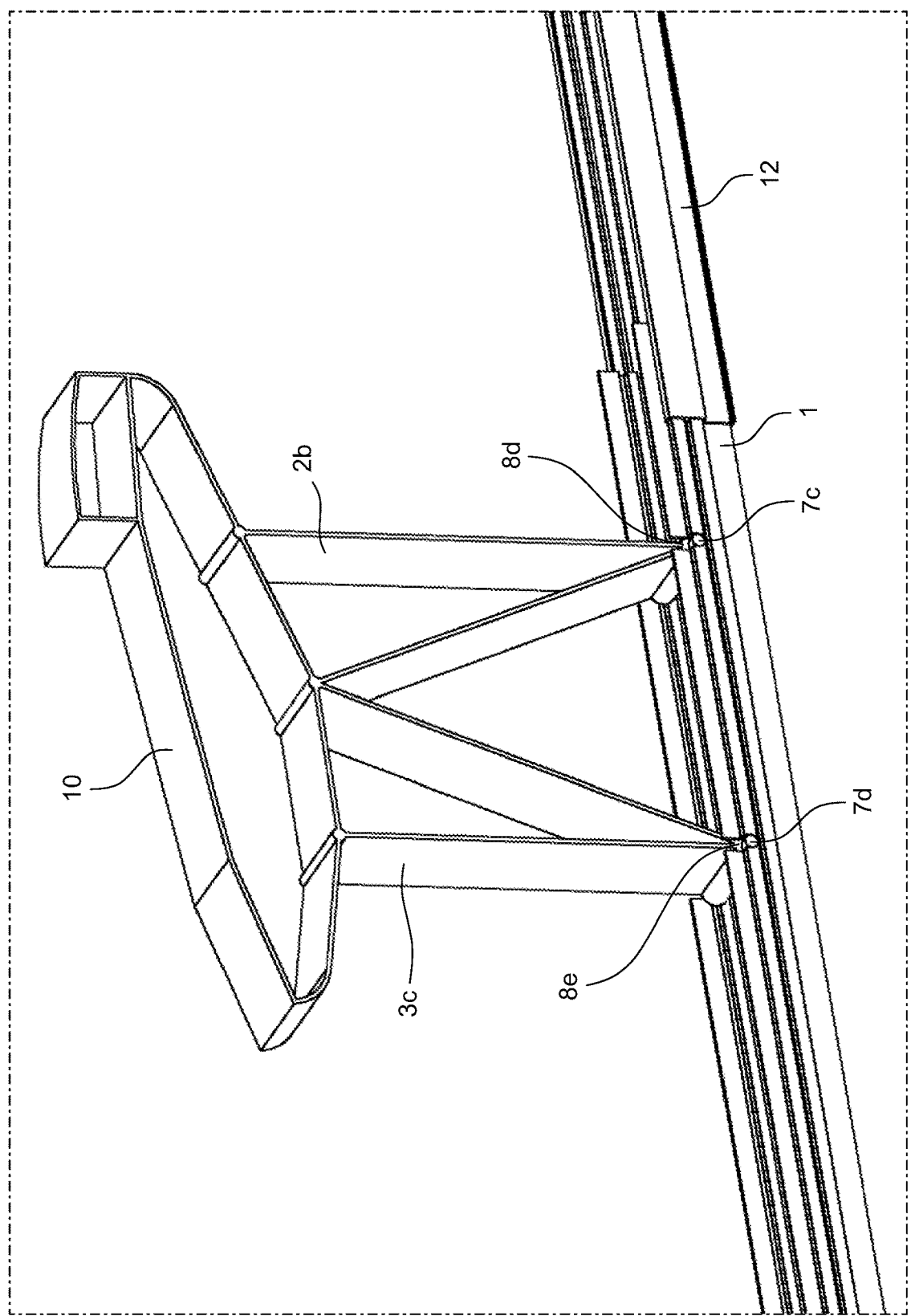
FIG. 4B shows another device for supporting solar modules having a high upper support.

FIGS. 4A and 4B show devices for supporting solar modules, in which a securing rail 12 is used for securing upper supports that are not height-adjustable. According to the representation in FIG. 4A, an upper support 2a with a first height is arranged on a base rail 1. For this purpose, the base rail 1 has two receiving openings 8d, 8e. The upper support 2a is formed with a support structure 3c, which, at the lower end thereof, has connecting elements 7c, 7d at its front and rear along the direction of extension of the base rail 1, which are arranged in the receiving openings 8d, 8e. For this purpose, receiving openings 8d, 8e of the base rail 1 are open at the top. A securing rail 12 may be pushed onto the base rail 1 so that it partially covers and closes the receiving openings 8d, 8e and thus secures the connecting elements 7c, 7d and consequently the upper support 2a—analogous to the statements relating to the embodiments in FIGS. 1 and 2. In comparison to FIG. 4A, in the embodiment according to FIG. 4B, an upper support 2b which is higher than the upper support 2a according to the embodiment of FIG. 4A is arranged on the base rail 1.

Each upper support 2a, 2b may thus be secured to the base rail 1 with the securing rail 12 when mounting the respective device according to FIGS. 4A and 4B, by moving the securing rail 12 into the second position. In addition, an exchange of upper supports is enabled by moving the securing rail 12 into the first position, removing the upper support arranged on the base rail 1, arranging the desired upper support on the base rail 1 and moving the securing rail 12 into the second position.

Figure 5:
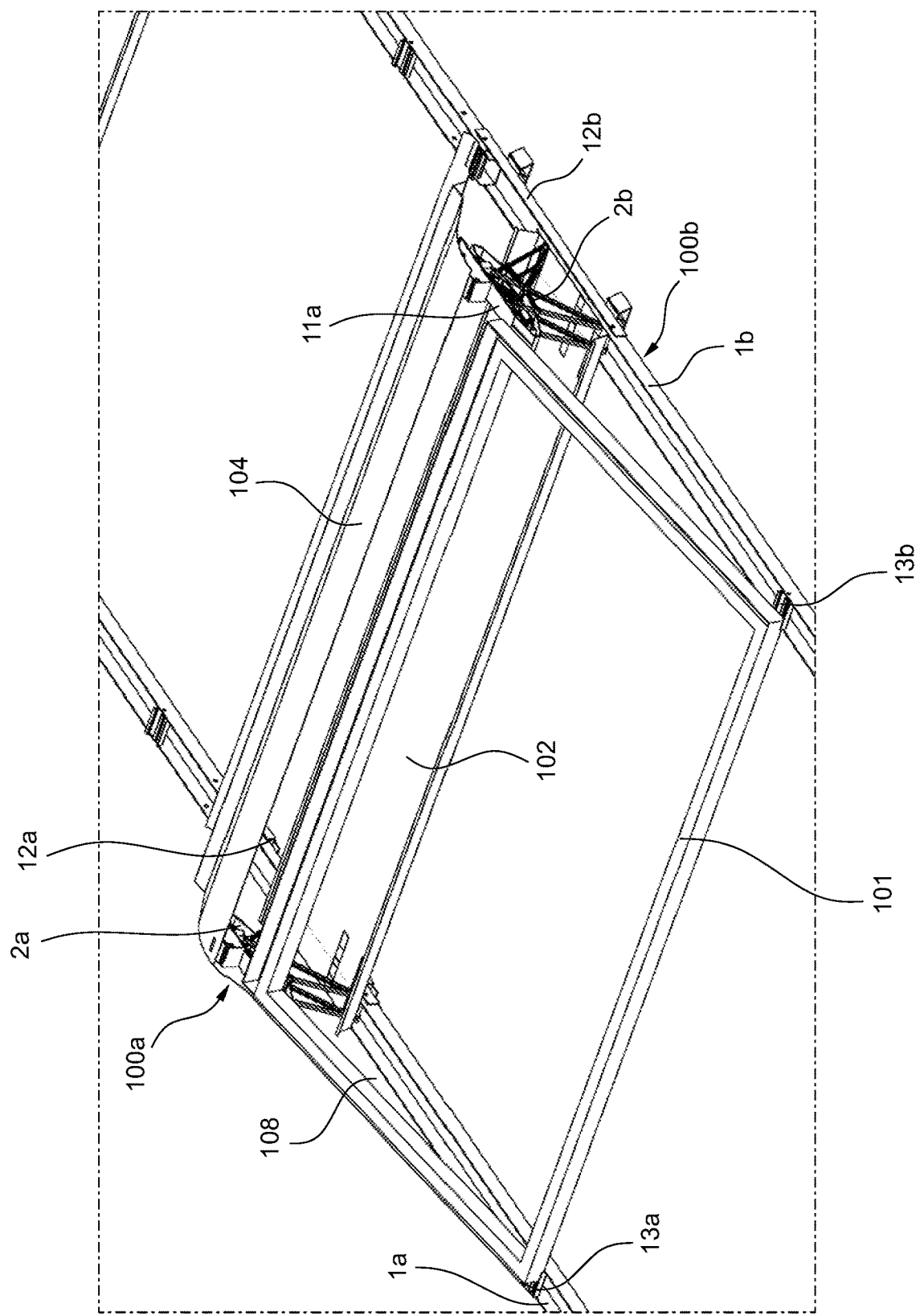
FIG. 5 shows a solar module arrangement in a one-sided 10-degree configuration.

FIG. 5 shows a solar module arrangement. The solar module arrangement comprises two devices 100a, 100b, each of which comprises a base rail 1a, 1b, an upper support 2a, 2b, a lower support 13a, 13b, and a connecting rail serving as a securing rail 12a, 12b for connecting the base rails 1a, 1b to additional base rails for expanding the holding system.

The base rails 1a, 1b of the devices 100a, 100b are oriented in parallel and the upper supports 2a, 2b and the lower supports 13a, 13b are respectively arranged at the same height to one another along the base rails 1a, 1b. A solar module 101, which for better clarity is shown only as a frame in FIG. 5, rests at an upper end on opposite sides on, and is held by, the bearing or support surfaces 11a of the upper supports 2a, 2b. At a lower end, the solar module 101 respectively rests with the opposite sides on, and is held by, the lower supports 13a, 13b. The solar module 101 is therefore held at four support points by means of the solar module arrangement, such that the support may be understood to be punctiform, in contrast to a linear support on the frame of the solar module 101. A four-point holder of the solar module 101 is thus provided with the holding system shown in FIG. 5.

The upper supports 2a, 2b of the devices 100a, 100b are each arranged with the first connecting elements 7a in the second receiving openings 8b, so that the upper supports 2a, 2b have the same height above the base rail 1 and the support surfaces 11a are at an angle with respect to the horizontal of 10 degrees. The solar module 101 is thus oriented in the holding system at an angle of 10 degrees with respect to the horizontal.

Figure 6:
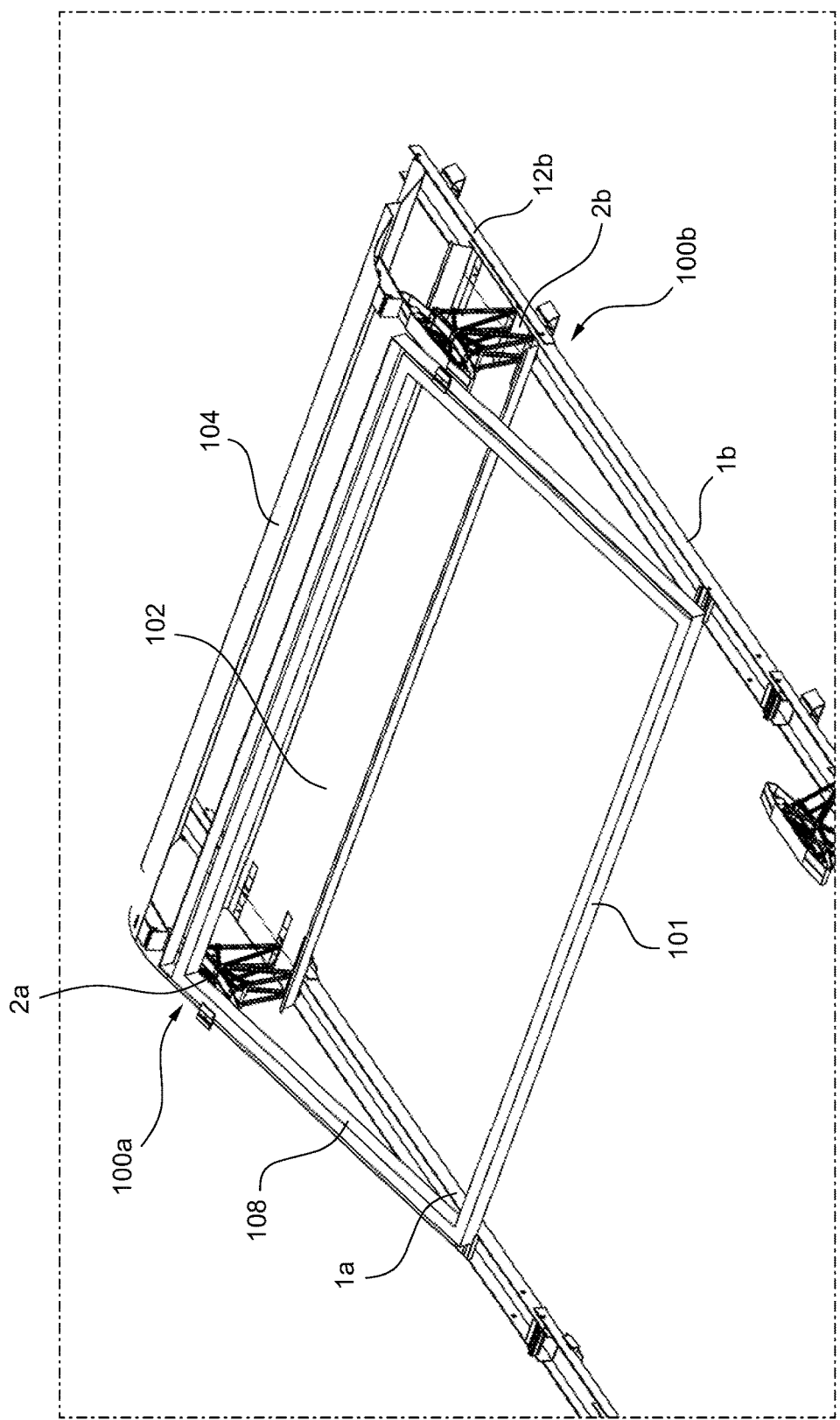
FIG. 6 shows another solar module arrangement in a one-sided 15-degree configuration.

FIG. 6 shows a solar module arrangement in a different configuration. In the solar module arrangement, the upper supports 2a, 2b are each arranged with the first connecting elements 7a in the first receiving openings 8a, so that the upper supports 2a, 2b have the same height above the base rail 1 and the support surfaces 11a are at an angle with respect to the horizontal of 15 degrees. The solar module 101 is thus oriented in the holding system according to FIG. 6 at an angle of 15 degrees with respect to the horizontal.

In alternative configurations, the devices 100a, 100b, in particular the upper supports 2a, 2b, may be designed in such a way that other angles of the solar module 101 may be set. For this purpose, receiving openings and pins 5 as well as bores in which the latter are received may be designed and arranged in such a way that with a corresponding arrangement of the first support elements 3a of the upper supports 2a, 2b, the desired angles of the solar module 101 are set.

A lateral arrangement of a plurality of solar modules 101, each of which is provided in an arrangement according to FIG. 5 or 6, may be provided. In this case, it may be provided that two solar modules 101 arranged next to one another are held next to one another on the same support surface 11a, so that two solar modules are held on the same upper support 2a, 2b.

Figure 7:
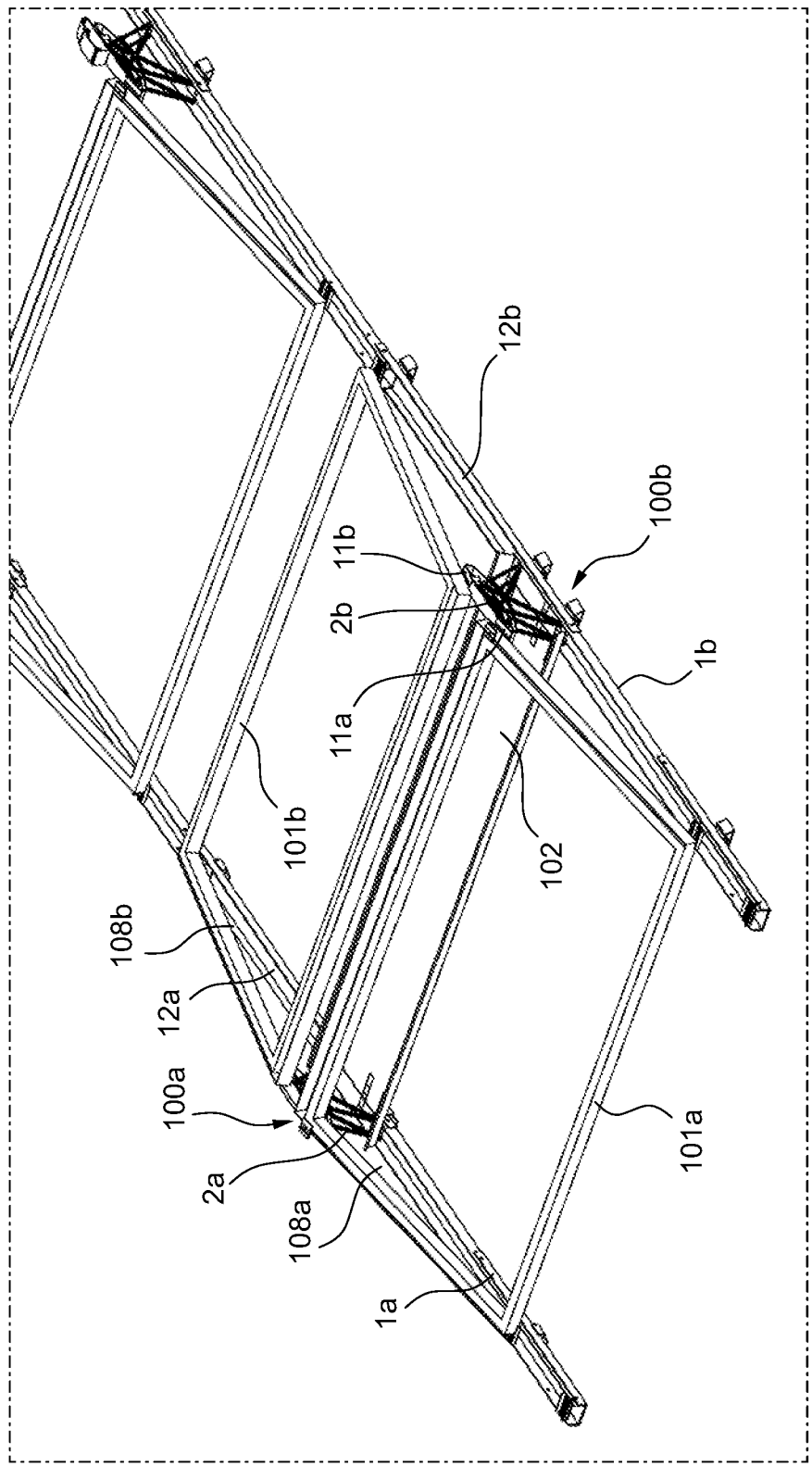
FIG. 7 shows yet another solar module arrangement in a two-sided 10-degree configuration.

FIG. 7 shows a further solar module arrangement in which two solar modules 101a, 101b are arranged one behind the other. In this case, the first solar module 101a rests at an upper end on opposite sides on, and is held by, the support surfaces 11a of the upper supports 2a, 2b. At the lower end thereof, the first solar module 101a respectively rests with the opposite sides on, and is held by, the lower supports 13a, 13b of the devices 100a, 100b. The second solar module 101b lies at an upper end on opposite sides on, and is held by, the support surfaces 11b of the upper supports 2a, 2b. At the lower end thereof, the second solar module 101b respectively rests with the opposite sides on, and is held by, further lower devices, which are otherwise not shown. An arrangement of a plurality of pairs of solar modules 101a, 101b according to FIG. 7 may be provided next to one another. In this case, it may be provided that two solar modules 101a, 101b arranged next to one another are held next to one another on the same support surface 11a, 11b, so that four solar modules are held on the same upper support 2a, 2b.

In the solar module arrangement according to FIG. 7, the upper supports 2a, 2b are each arranged with the first connecting elements 7a in the second receiving openings 8b, so that the upper supports 2a, 2b have the same height above the base rail 1, and the support surfaces 11a, 11b each have an angle to the horizontal of 10 degrees, the support surfaces 11a, 11b being arranged so as to descend in opposite directions. The solar modules 101a, 101b in the solar module arrangement according to FIG. 7 are thus each oriented opposite one another at an angle of 10 degrees with respect to the horizontal and lowered in opposite directions.

Figure 8A:
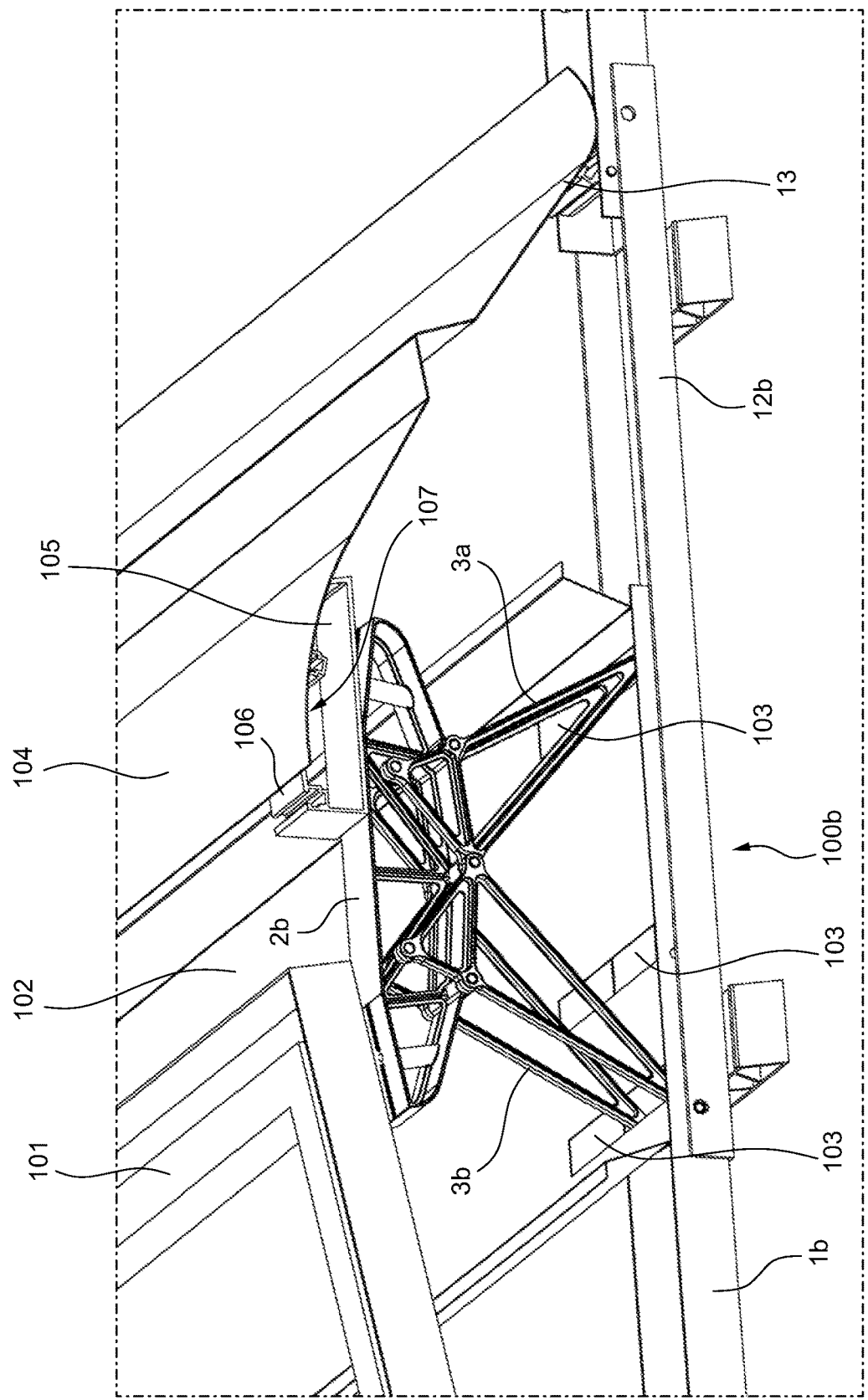
FIG. 8A shows a detailed view of a solar module arrangement.
Figure 8B:
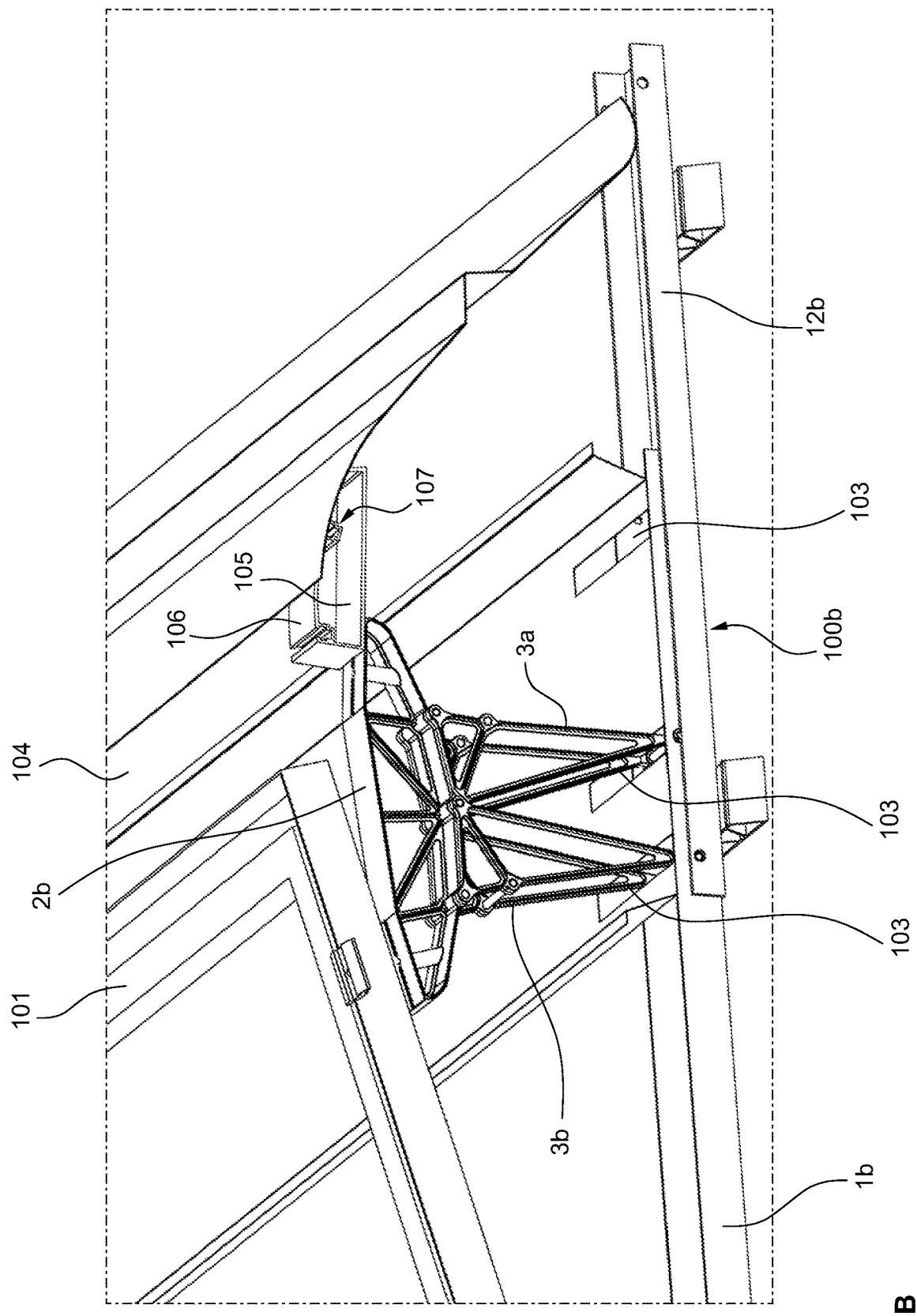
FIG. 8B shows a detailed view of a further solar module arrangement.

The solar module arrangements shown in FIGS. 5, 6, and 7 are configured for mounting solar modules on flat roofs, the disclosed holding systems also being usable for other applications, for example a free-standing mounting of solar modules. In the case of a flat roof mounting, it is not possible in many applications to connect the holding system to the roof. For this reason, and to increase safety in embodiments in which a connection to the flat roof is possible, the holding systems of the solar module arrangements according to the embodiments of FIGS. 5, 6, and 7 have ballast troughs 102, which may be filled with ballast in order to increase the weight of the holding system and thus to prevent movement of the holding system, for example due to the action of wind. The ballast troughs rest on opposite sides in edge areas on the base rails 1*a*, 1*b*. As can be seen in particular in the detailed views of FIGS. 8A and 8B, the ballast troughs 102 have openings 103 in the edge regions. The openings 103 are arranged and shaped in such a way that the support elements 3*a*, 3*b* in the various arrangements of the connecting elements 7*a*, 7*b* in the receiving openings 8*a*, 8*b*, 8*c* are received in the openings 103. This is shown in FIG. 8A for a configuration of the arrangement 100*b* for a 10-degree orientation of the solar module 101. FIG. 8B shows a corresponding configuration for a 15-degree orientation of the solar module 101.

The shape of the support elements 3*a*, 3*b*, in particular, the upward widening thereof and the oblique orientation of the struts of the cast metal parts 4, limit the upward movement of the ballast trough 102. A (complete) lifting of the ballast trough 102 from the base rails 1*a*, 1*b* is thus prevented. In this way, the ballast trough 102 is secured to the holding system.

The solar module arrangements shown in FIGS. 5 and 6 also each have a rear wind deflector 104. The rear wind deflector 104 is formed with a shaped metal sheet and prevents wind from flowing from behind under the respective solar module 101 and moving it upward. As shown by way of example in the detailed representations of FIGS. 8A and 8B for different configurations of the upper support 2*b*, a deflector holder 105 is arranged on the holding device 10 of the upper support 2*b*. The deflector holder 105 has a support surface 106 which is convexly rounded. The rear wind deflector 104 has a contact surface 107, which is shaped in a concavely rounded manner, adapted to the shape of the support surface 106. The respective shape of the support surface 106 and the contact surface 107 in this case is selected in such a way that the rear wind deflector 104 is merely shifted on the support surface 106 between a high configuration of the upper support 2*b* and a low configuration of the upper support 2*b*. This may be seen, in particular, in the comparison of FIGS. 8A and 8B. Due to the shaping of the contact surface 107, the same rear wind deflector 104 is therefore suitable in connection with the deflector holder 105 for use in holding systems or in solar module arrangements with different angular configurations of solar elements, for example, both for a holding system in a 10-degree configuration, as shown by way of example in FIG. 5, as well as for a holding system in a 15-degree configuration, as shown by way of example in FIG. 6.

The upper end of the rear wind deflector 104 is fixed in the desired position on the deflector holder 105 by means of appropriate fastening means or fasteners. For example, the rear wind deflector 104 arranged on the support surface 106 may be screwed to the deflector holder 105 or fixed by means of clamping elements. A lower end of the rear wind deflector 104 may be held by means of a lower support 13. In FIG. 8A, it is shown by way of example that the lower end of the wind deflector 104 is held by a lower support 13 of a further arrangement which is otherwise not shown, and which is arranged behind the arrangement 100*b*. Alternatively, the lower end of the wind deflector 104 may rest on another element. In FIG. 8B, it is shown by way of example that the rear end of the wind deflector 104 rests on the connecting rail of the arrangement 100*b*, which serves as a securing rail 12*b*.

In addition, or as an alternative to a rear wind deflector 104, lateral wind deflectors 108 may be provided in order to prevent wind from flowing from the side under the respective solar module 101 and moving the solar module upward. Such a lateral wind deflector 108 is shown in FIGS. 5 and 6 in the form of a metal sheet on the respective arrangement 100*a* in. According to the embodiment of FIG. 7, two lateral wind deflectors 108*a*, 108*b* are provided on the arrangement 100*a*, which together shield the entire side of the holding system from the wind. For better clarity, no lateral wind deflectors 108 are shown in FIGS. 5, 6, and 7 on the respective arrangement 100*b*. Corresponding lateral wind deflectors 108 may, however, also be provided for the arrangements 100*b* according to the embodiments of FIGS. 5, 6, and 7.

Alternatively, or in addition, a cable routing may be provided on or in the support elements 3*a*, 3*b*.

Figure 9:
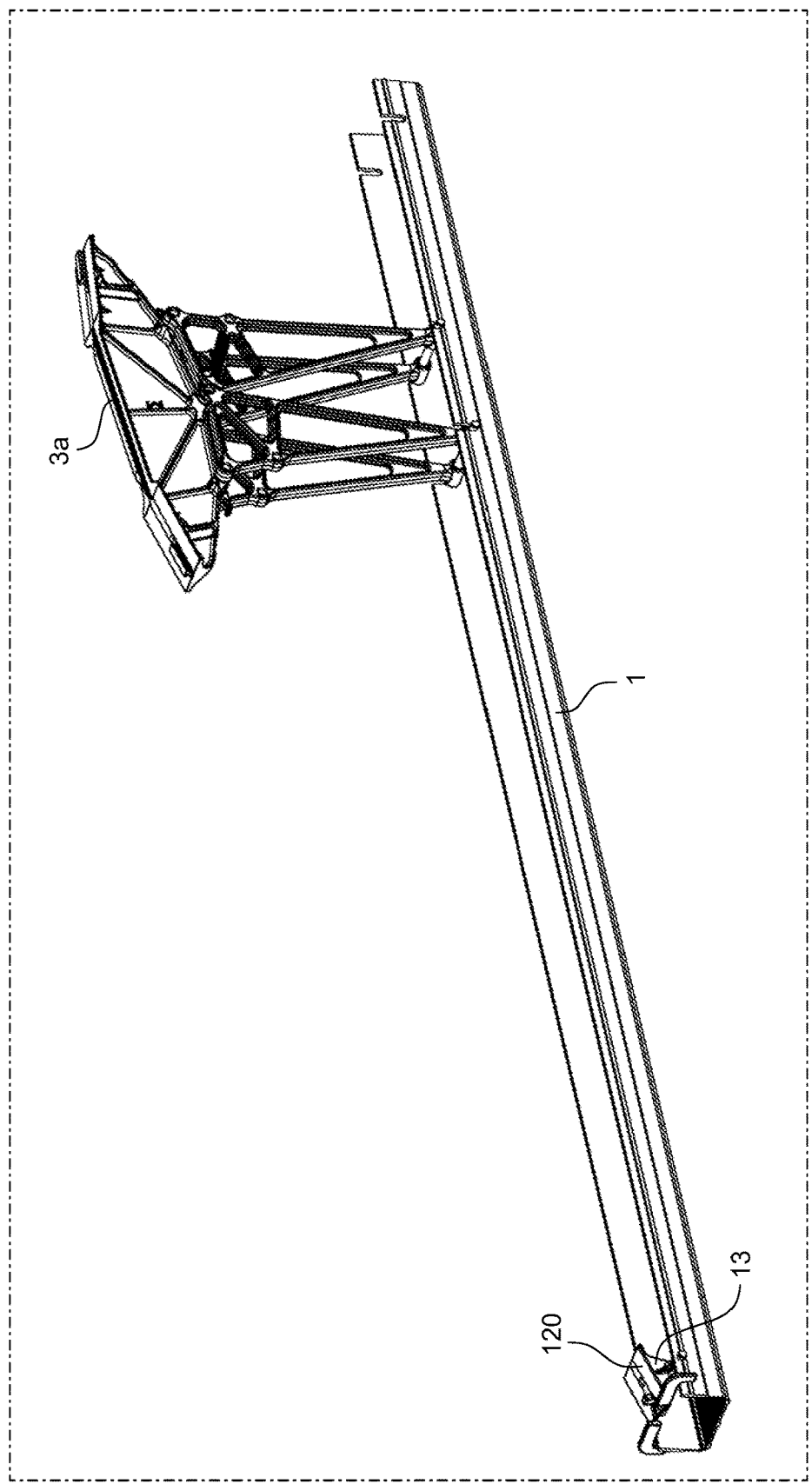
FIG. 9 shows a schematic representation of an arrangement for a device for supporting a solar module with the base rail.

FIG. 9 shows a schematic representation of an arrangement for a device for supporting a solar module with the base rail 1, on which the support element 3*a* is arranged as part of the upper support. A further embodiment of the lower support 13 having a support component 120 pivotably mounted on the base rail 1 is arranged on the base rail 1. The section of the base rail 1 having the support or holding component 120 is shown enlarged in FIG. 10. The support component 120 provides a support surface or bearing surface 121 for placing the solar module (not shown), a spacer pin 123 being arranged on bearing surfaces 121, 122 formed next to one another, with which spacer pin 123 a stop is formed for the solar modules to be arranged on both sides. The holding component 120 is mounted on the base rail 1 so as to be pivotable about a pivot axis 124, which extends transversely to the longitudinal direction of the base rail 1. In the position shown in FIGS. 9 and 10, retaining claws 125 grasp the base rail 1 on opposite sides and at a distance from the base rail 1, so that the shear rail 12 (not shown) may be pushed into the spacing area between the base rail 1 and the holding claw 125. If the holding component 120 is pivoted about the pivot axis 124, the holding claws 125 may be released from the engagement shown in FIG. 10 (by pivoting upwards). The pivotable mounting of the holding component 120 thus enables a continuous adjustment to different angles of inclination of the solar module.

Figure 10:
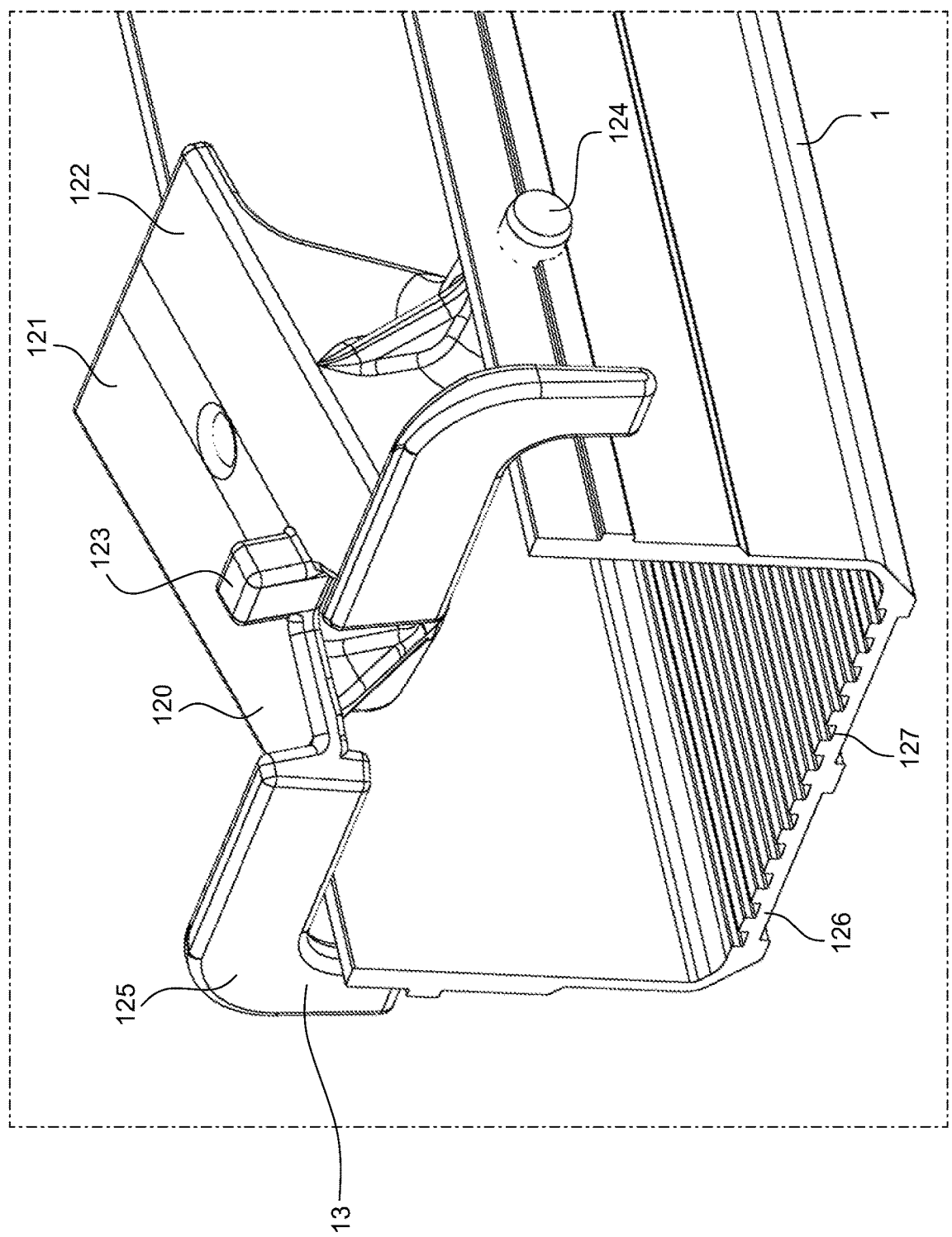
FIG. 10 shows a schematic representation of a portion of the arrangement from FIG. 9 with a support component or holding component.
Figure 11:
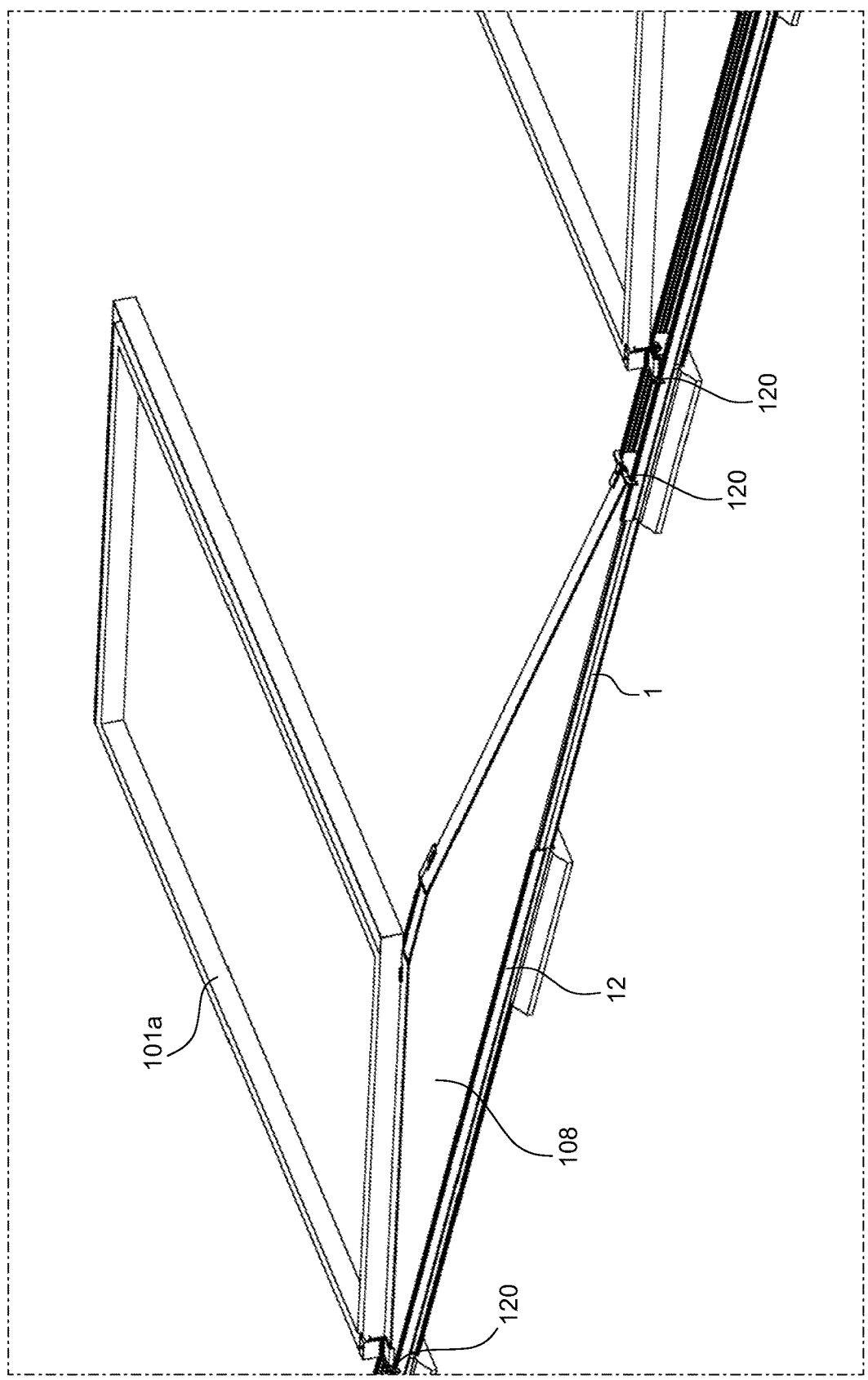
FIG. 11 shows a schematic representation of an arrangement for a device for supporting a solar module having a lateral wind deflector.
Figure 12:
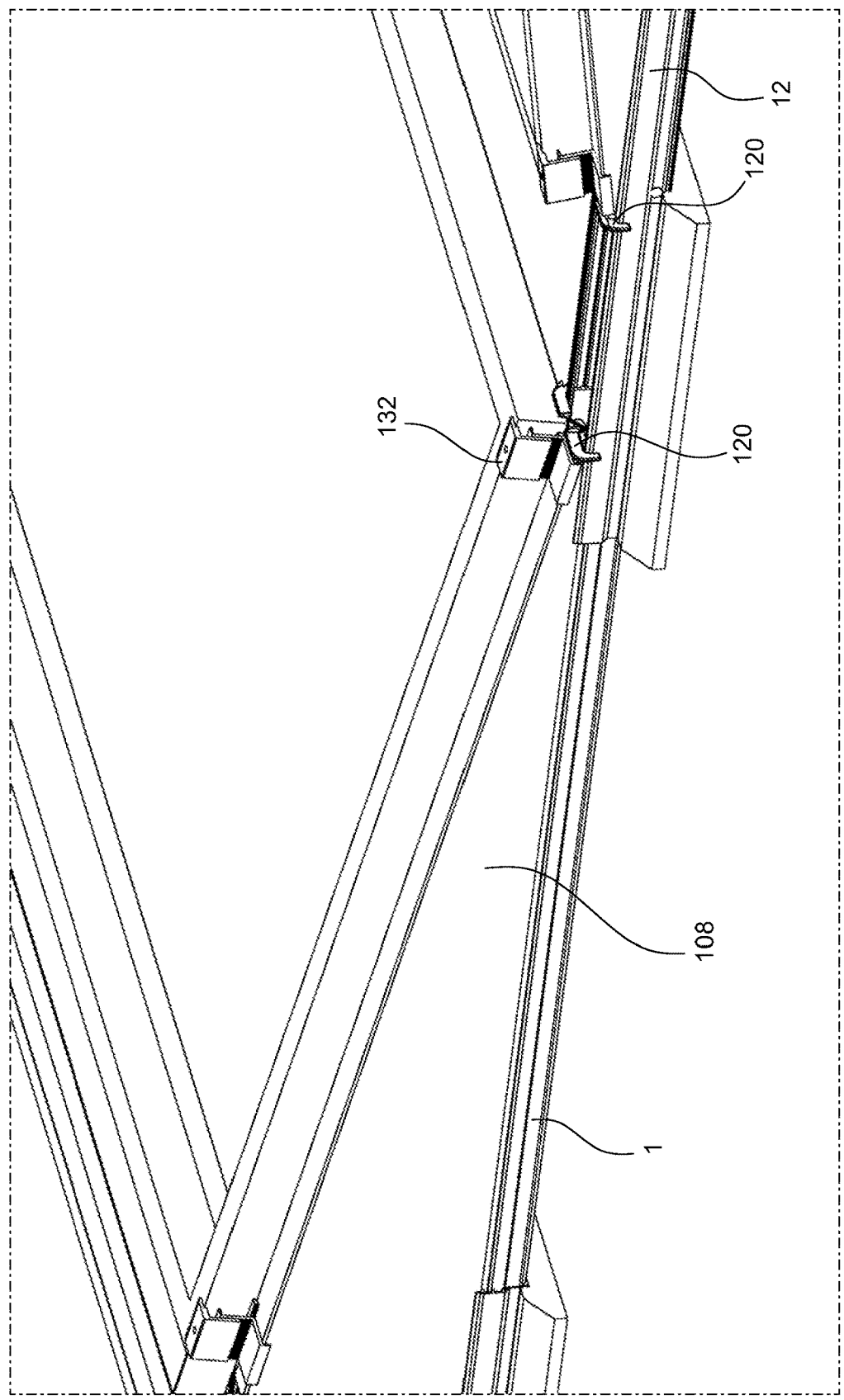
FIG. 12 shows a schematic representation of a portion of the arrangement from FIG. 11.
Figure 13:
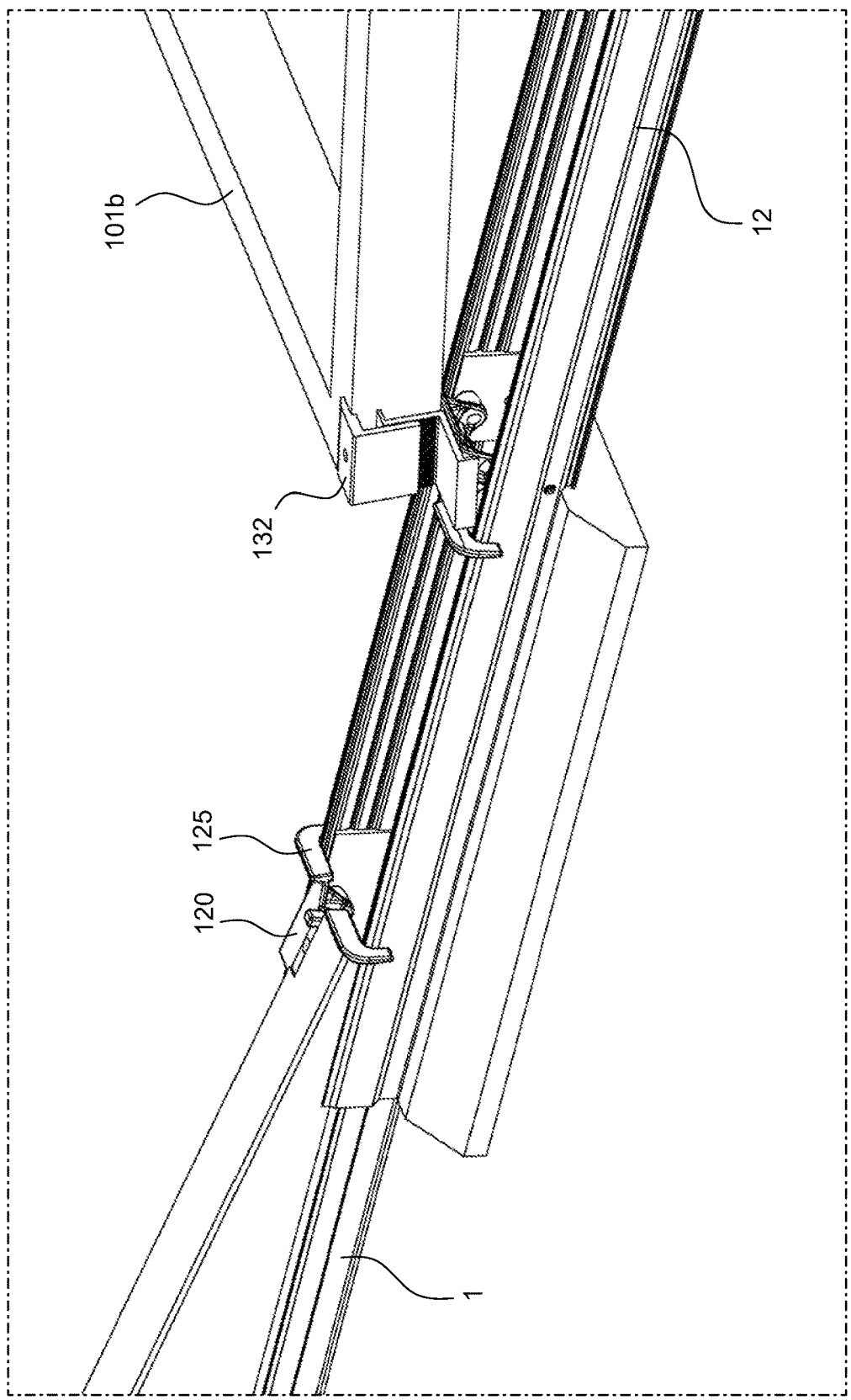
FIG. 13 shows an enlarged schematic representation of the portion of the arrangement from FIG. 12.
Figure 14:
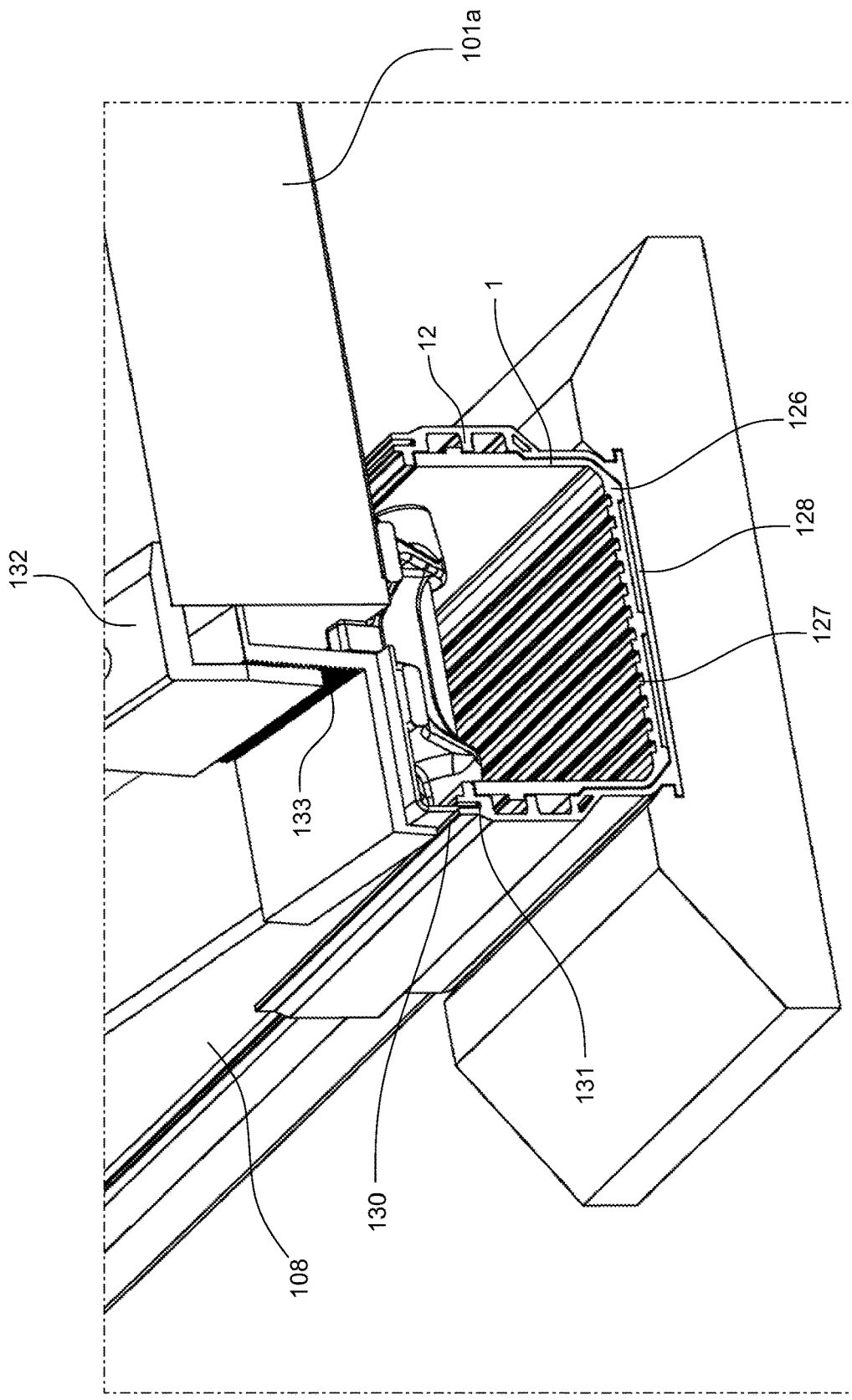
FIG. 14 shows an enlarged schematic representation of the portion of the arrangement from FIG. 13 having a support component or holding component.
Figure 15:
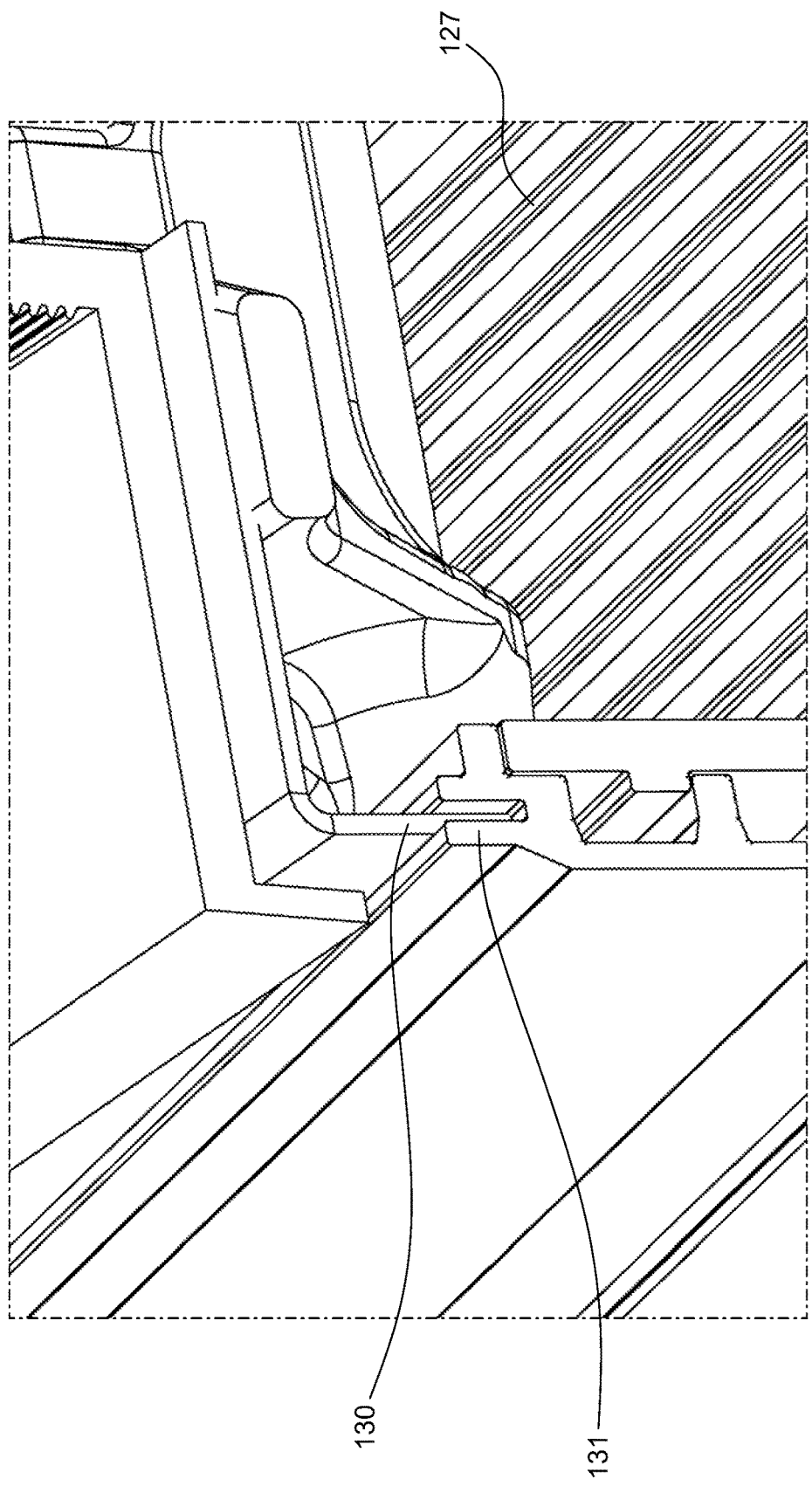
FIG. 15 shows an enlarged schematic representation of the portion of the arrangement from FIG. 14.

According to the representation in FIG. 10, drainage grooves 127 are formed in the bottom area 126 in the longitudinal direction of the base rail 1, which serve to drain water, in particular rainwater (cf. also the detailed representation in FIG. 14). If cables are inserted into the base rail 1, this prevents the cables from lying in the water. The water thus draining from the base rail 1 via the drainage grooves 127 may then reach the securing rail 12 below and be discharged there to the outside to recesses 128 which are formed on the securing rail 12. Drainage channels are formed by means of the recesses 128 and of the base of the securing rail arranged above them.

FIGS. 11 to 15 show an embodiment in which the lateral wind deflector 108 is provided. According to FIGS. 14 and 15, a section 130 of the lateral wind deflector 108 is received in a recess 131 on the securing rail 12 and is thus secured in the mounting position thereof.

The solar module 101*a* is secured to the holding component 120 by means of a clamping element 132, a screw connection being used as a mechanical securing means in the embodiment shown. The clamping element 132 may be adjusted by means of assigned latching profiles 133, via which solar modules of different heights or thicknesses are clamped.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A device for supporting solar modules, comprising
a base rail comprising a first receiving opening;
a support arranged on the base rail for holding one end of a solar module of the solar modules, the support comprising a first connecting element which is arranged in the first receiving opening; and
a securing rail which is arranged on the base rail so as to at least partially encompass the base rail and is movable along the base rail between a first position and a second position,
wherein
the securing rail at least partially closes the first receiving opening in the second position in such a way that a movement of the first connecting element out of the first receiving opening is prevented; and
the securing rail unblocks the first receiving opening in the first position in such a way that a movement of the first connecting element out of the first receiving opening is made possible.

2. The device according to claim 1, comprising a securing element which is configured to secure the securing rail in the second position such that a movement of the securing rail from the second position to the first position is prevented.

3. The device according to claim 2, wherein the securing element is movable without tools between a securing position, in which a movement of the securing rail from the second position to the first position is prevented, and an unblocking position in which a movement of the securing rail from the second position to the first position is possible.

4. The device according to at claim 1, wherein the securing rail is formed with a connecting rail which is configured to connect the base rail to a further base rail of a further device.

5. The device according to at least claim 1, wherein the first receiving opening is open at least to an upper side of the base rail and the securing rail in the second position at least partially covers the first receiving opening on the upper side of the base rail.

6. The device according to claim 1, wherein
the base rail has a second receiving opening;
the support is configured to be arranged with the first connecting element in the first receiving opening or in the second receiving opening; and
the securing rail
closes the second receiving opening in the second position in such a way that a movement of the first connecting element out of the second receiving opening is prevented; or
is movable along the base rail to a third position in which the securing rail at least partially closes at least the second receiving opening in such a way that a movement of the first connecting element out of the second receiving opening is prevented.

7. The device according to claim 6, wherein
the support is arranged in a first holding position in which the support is configured to hold the solar module at a first angle relative to the base rail when the first connecting element is arranged in the first receiving opening; and
the support is arranged in a second holding position in which the support is configured to hold the solar module at a second angle relative to the base rail, the second angle being different from the first angle, when the first connecting element is arranged in the second receiving opening.

8. The device according claim 1, wherein the support is an upper support for holding an upper end of the solar module.

9. The device according to claim 8, comprising a lower support arranged on the base rail for holding a lower end of the solar module.

10. The device according to claim 1, wherein the base rail is configured to receive and route a cable of the solar module.

11. The device according to claim 1, wherein the base rail is configured for arranging one side of a ballast holding device thereon in such a way that the ballast holding device rests at least in sections on the base rail and the support is configured to be arranged at least in sections in at least one opening of the ballast holding device when it rests at least in sections on the base rail, the support being shaped in such a way that it substantially prevents an upward movement of the ballast holding device in this case.

12. A kit for a device according to claim 1, comprising
a base rail comprising a first receiving opening and
a support for holding one end of a solar module, comprising a first connecting element; and
a securing rail,
wherein
the support is configured to be arranged on the base rail for supporting solar modules and the first connecting element is configured, in this case to be arranged in the first receiving opening; and
the securing rail is configured to be arranged on the base rail so as to at least partially encompass the base rail and to be moved along the base rail between a first position and a second position, wherein
the securing rail at least partially closes the first receiving opening in the second position in such a way that a movement of the first connecting element out of the first receiving opening is prevented; and
the securing rail unblocks the first receiving opening in the first position in such a way that a movement of the first connecting element out of the first receiving opening is made possible.

13. A method for manufacturing a device for supporting solar modules, comprising:
providing a base rail comprising a first receiving opening;
arranging a support for holding one end of a solar module of the solar modules, the support comprising a first connecting element, on the base rail, wherein the first connecting element is arranged in the first receiving opening;
arranging a securing rail on the base rail and at least partially encompassing it in a first position in which the securing rail unblocks the first receiving opening in such a way that a movement of the first connecting element out of the first receiving opening is made possible; and
moving the securing rail along the base rail from the first position to a second position in which the securing rail at least partially closes the first receiving opening in such a way that a movement of the first connecting element out of the first receiving opening is prevented.

14. A solar module arrangement comprising a plurality of devices according to claim 1, the plurality of devices comprising a first device and a second device; and a solar module,
wherein
the first device and the second device are arranged and oriented with respect to one another in such a way that the base rail of the first device and the base rail of the second device extend substantially parallel and the support of the first device is arranged directly opposite the support of the second device;
the solar module is arranged with a first side on the first device, wherein one end of the solar module is held in the region of the first side by the support of the first device, and is arranged with a second side opposite the first side on the second device, wherein the end of the solar module is held in the region of the second side by the support of the second device; and
the securing rail of the first device and the securing rail of the second device are respectively arranged in the second position such that the first receiving opening of the base rails of the first and the second device are each at least partially closed and a movement of the respective first connecting element of the first and the second device out of the respective first receiving opening is prevented.

15. The solar module arrangement according to claim 14, wherein the plurality of devices further comprise a third device and a fourth device; and the solar module arrangement further comprises a further solar module,
wherein
the third device is arranged and oriented behind the first device in such a way that a longitudinal axis of the base rail of the first device and a longitudinal axis of the base rail of the third device are substantially superimposed;
the fourth device is arranged and oriented behind the second device in such a way that a longitudinal axis of the base rail of the second device and a longitudinal axis of the base rail of the fourth device are substantially superimposed;
the third device and the fourth device are arranged and oriented with respect to one another in such a way that the support of the third device is arranged directly opposite the support of the fourth device;
the further solar module is arranged with a first side on the third device, wherein one end of the further solar module is held in the region of the first side by the support of the third device, and is arranged with a second side opposite the first side on the fourth device, wherein the end of the further solar module is held in the region of the second side by the support of the fourth device;
the securing rail of the first device
is arranged in the second position at least partially encompassing the base rail of the first device with a first end of the securing rail of the first device and
is arranged on and at least partially encompassing the base rail of the third device with a second end of the securing rail of the first device opposite the first end; and
the securing rail of the second device
is arranged in the second position at least partially encompassing the base rail of the second device with a first end of the securing rail of the second device and
is arranged on and at least partially encompassing the base rail of the fourth device with a second end of the securing rail of the second device opposite the first end.

* * * * *